United States Patent
Tock et al.

(10) Patent No.: US 8,326,981 B2
(45) Date of Patent: *Dec. 4, 2012

(54) METHOD AND SYSTEM FOR PROVIDING SECURE ACCESS TO PRIVATE NETWORKS

(75) Inventors: Theron Tock, Mountain View, CA (US); Sampath Srinivas, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 12/821,928

(22) Filed: Jun. 23, 2010

(65) Prior Publication Data

US 2010/0263035 A1 Oct. 14, 2010

Related U.S. Application Data

(63) Continuation of application No. 10/060,792, filed on Jan. 29, 2002, now Pat. No. 7,774,455, which is a continuation-in-part of application No. 09/706,181, filed on Nov. 2, 2001, now abandoned.

(60) Provisional application No. 60/235,513, filed on Sep. 26, 2000, provisional application No. 60/350,097, filed on Nov. 2, 2001.

(51) Int. Cl.
*G06F 15/16* (2006.01)
(52) U.S. Cl. ......... 709/224; 709/226; 709/227; 713/168
(58) Field of Classification Search .......... 709/200–203, 709/217–227
See application file for complete search history.

(56) References Cited

U.S. PATENT DOCUMENTS

| | | | |
|---|---|---|---|
| 5,491,752 | A | 2/1996 | Kaufman et al. |
| 5,586,260 | A | 12/1996 | Hu |
| 5,649,099 | A | 7/1997 | Theimer et al. |
| 5,752,022 | A | 5/1998 | Chiu et al. |
| 5,799,318 | A | 8/1998 | Cardinal et al. |
| 5,826,014 | A | 10/1998 | Coley et al. |
| 5,826,242 | A | 10/1998 | Montulli |
| 5,898,836 | A | 4/1999 | Freivald et al. |
| 5,935,212 | A | 8/1999 | Kalajan et al. |
| 5,948,066 | A | 9/1999 | Whalen et al. |
| 5,978,842 | A | 11/1999 | Noble et al. |

(Continued)

FOREIGN PATENT DOCUMENTS

EP 0 855 659 A1 7/1998

(Continued)

OTHER PUBLICATIONS

Co-pending U.S. Appl. No. 10/060,792, filed Jan. 29, 2002 entitled "Method and System for Providing Secure Access to Private Networks" by Theron Tock et al., 84 pages.

(Continued)

*Primary Examiner* — Moustafa M Meky
(74) *Attorney, Agent, or Firm* — Harrity & Harrity, LLP

(57) ABSTRACT

Improved approaches for providing secure access to resources maintained on private networks are disclosed. The secure access can be provided through a public network using a standard network browser. Multiple remote users are able to gain restricted and controlled access to at least portions of a private network through a common access point. The solution provided by the invention is not only easily set up and managed, but also able to support many remote users in a cost-effective manner.

20 Claims, 23 Drawing Sheets

U.S. PATENT DOCUMENTS

| | | | |
|---|---|---|---|
| 5,983,268 | A | 11/1999 | Freivald et al. |
| 5,987,523 | A | 11/1999 | Hind et al. |
| 5,991,878 | A | 11/1999 | McDonough et al. |
| 6,006,258 | A | 12/1999 | Kalajan |
| 6,012,087 | A | 1/2000 | Freivald et al. |
| 6,029,182 | A | 2/2000 | Nehab et al. |
| 6,052,716 | A | 4/2000 | Gibson |
| 6,052,730 | A | 4/2000 | Felciano et al. |
| 6,141,686 | A | 10/2000 | Jackowski et al. |
| 6,158,011 | A | 12/2000 | Chen et al. |
| 6,182,141 | B1 | 1/2001 | Blum et al. |
| 6,182,142 | B1 | 1/2001 | Win et al. |
| 6,185,598 | B1 | 2/2001 | Farber et al. |
| 6,202,156 | B1 | 3/2001 | Kalajan |
| 6,230,002 | B1 | 5/2001 | Floden et al. |
| 6,260,187 | B1 | 7/2001 | Cirne |
| 6,263,064 | B1 | 7/2001 | O'Neal et al. |
| 6,286,029 | B1 | 9/2001 | Delph |
| 6,289,333 | B1 | 9/2001 | Jawahar et al. |
| 6,298,356 | B1 | 10/2001 | Jawahar et al. |
| 6,304,908 | B1 | 10/2001 | Kalajan |
| 6,401,077 | B1 | 6/2002 | Godden et al. |
| 6,466,966 | B1 | 10/2002 | Kirsch et al. |
| 6,490,602 | B1 | 12/2002 | Kraemer |
| 6,499,108 | B1 | 12/2002 | Johnson |
| 6,505,230 | B1 | 1/2003 | Mohan et al. |
| 6,510,464 | B1 | 1/2003 | Grantges et al. |
| 6,591,305 | B2 | 7/2003 | Densmore |
| 6,598,081 | B1 | 7/2003 | Coile et al. |
| 6,598,167 | B2 | 7/2003 | Devine et al. |
| 6,654,814 | B1 | 11/2003 | Britton et al. |
| 6,671,724 | B1 | 12/2003 | Pandya et al. |
| 6,681,327 | B1 | 1/2004 | Jardin |
| 6,836,765 | B1 * | 12/2004 | Sussman .................. 705/75 |
| 6,950,935 | B1 | 9/2005 | Allavarpu et al. |
| 6,983,381 | B2 | 1/2006 | Jerdonek |
| 7,047,485 | B1 | 5/2006 | Klein et al. |
| 7,085,817 | B1 | 8/2006 | Tock et al. |
| 7,136,896 | B1 | 11/2006 | Srinivas et al. |
| 7,146,403 | B2 | 12/2006 | Tock et al. |
| 7,185,360 | B1 | 2/2007 | Anton et al. |
| 7,620,719 | B2 | 11/2009 | Tock et al. |
| 7,631,084 | B2 | 12/2009 | Thomas et al. |
| 7,774,455 | B1 * | 8/2010 | Tock et al. .............. 709/224 |
| 2001/0047421 | A1 | 11/2001 | Sridhar et al. |
| 2002/0007393 | A1 | 1/2002 | Hamel |
| 2002/0083342 | A1 | 6/2002 | Webb et al. |
| 2002/0133549 | A1 | 9/2002 | Warrier et al. |
| 2002/0174174 | A1 | 11/2002 | Ramraj et al. |
| 2003/0051161 | A1 | 3/2003 | Smith et al. |
| 2003/0065791 | A1 | 4/2003 | Garg et al. |
| 2004/0073566 | A1 | 4/2004 | Trivedi |
| 2005/0021762 | A1 | 1/2005 | Gbadegesin |
| 2005/0060725 | A1 | 3/2005 | D'Souza et al. |

FOREIGN PATENT DOCUMENTS

| | | |
|---|---|---|
| EP | 0 967 765 A2 | 2/1999 |
| EP | 1 039 396 A2 | 9/2000 |
| WO | WO 99/66385 | 12/1999 |
| WO | WO 00/11832 | 3/2000 |

OTHER PUBLICATIONS

Campione et al., "The Java Tutorial: Object-Oriented Programming for the Internet," Addison-Wesley, 1997, http://journals.ecs.soton.ac.uk/java/tutorial/applet/overview/html.html, 3 pages.

Ragget, HTML 3.2 Reference Specification, W3C Recommendation, Jan. 1997, http://www.w3.org/TR/REC-html32, 49 pages.

Sun Microsystems: The Applet Tag; http://java.sun.com/j2se/1.4.2/docs/guide/misc/applet.html, included in IDS filed on Aug. 27, 2008 for U.S. Appl. No. 10/060,792, 3 pages.

The Microsoft Computer Dictionary, 5$^{th}$ ed., Redmond, WA: Microsoft Press, May 1, 2002, p. 474.

NetMind, "Products: Free Mind-it Service," Information Datasheet, Netmind,http://www.netmind.com/html/free_mind-it_service.html, downloaded Jul. 4, 2000, pp. 1-2.

NetMind, "Products: Tracking," Information Datasheet, Netmind, http://www.netmind.com/html/products_tracking.html, downloaded July 4, 2000, pp. 1-2.

NetMind, "Company: Technology," Information Datasheet, Netmind, http://www.netmind.com/html/technology.html, downloaded Jul. 4, 2000, pp. 1-2.

Yahoo! Companion, "What is the Stock Market Toolbar?," Information Datasheet, Yahoo! Inc., http://docs.companion.yahoo.com/companion/learnmore_companion.html, downloaded Nov. 3, 2000, pp. 1-4.

Yahoo! Companion, "What is Yahoo! Companion?," Information Datasheet, Yahoo! Inc., http://docs.companion.yahoo.com/companion/learnmore_companion.html, downloaded Nov. 3, 2000, pp. 1-4.

Yahoo! Companion, "Yahoo! Content and features on your browser," Information Datasheet, Yahoo! Inc., http://edit.yahoo.com/config/download_companion, downloaded Nov. 3,2000, p. 1.

Third Voice, Service Information, thirdvoice, Inc., http://www.thirdvoice.com, downloaded Sep. 4, 2000, pp. 1-3.

Netmind, "Webmaster: Your Web Site Essentials," Information Datasheet, Netmind, http://www.netmind.com/html/webmasters.html, downloaded Sep. 4, 2000, pp. 1-2.

Desktop.com, "Welcome to Desktop.com!," Information Datasheet, http://www.desktop.com/, downloaded Sep. 26, 2000, p. 1.

Desktop.com, "Desktop.com Solutions," Information Datasheet, http://www.desktop.com/app/home/show/solutions/solutions.html, downloaded Sep. 26, 2000, pp. 1-2.

Desktop.com, "Company-About Us," Information Datasheet, http://www.desktop.com/static/home/company.html, downloaded Sep. 4, 2000, p. 1.

Desktop.com, "Company-Products," Information Datasheet, http://www.desktop.com/static/home/products.html, downloaded Sep. 4, 2000, pp. 1-2.

Google, How to Google, "Why use Google?," Information Datasheet, Google Inc., http://www.google.com/why_use.html, downloaded Sep. 4, 2000, pp. 1-3.

Google, Business Development, "Google's advanced search Features," Information Datasheet, Google Inc., http://www.google.com/adv_features.html, dowloaded Sep. 4, 2000, pp. 1-2.

Anonymizer.com, Online Privacy Services, Information Datasheet, http://www anonymizer.com/, downloaded Sep. 26, 2000, p. 1.

Anonymizer.com, Online Privacy Services, Information Datasheet, http://www.anonyrnizer.com/services/index.shmtl, downloaded Sep. 26, 2000, pp. 1-4.

Third Voice, "Meet your Web Assistant," Information Datasheet, Thirdvoice, Inc., http://www.thirdvoice.com/whatIs/index.htm, downloaded Sep. 26, 2000, pp. 1-3.

AltaVista, "Translations," Information Datasheet, AltaVista Company, http://babelfish.altavista.com/translate.dyn, downloaded Sep. 4, 2000, p. 1.

"My AltaVista: How to Use Babel Fish-What is AltaVista Babel Fish?," Information Datasheet, AltaVista Company, http://live.altavista.com/s?page=help/bf_what.htm, downloaded on Sep. 4, 2000, pp. 1-2.

Barrett et al., "Intermediaries: new places for producing and manipulating Web content," Computer Networks and ISDN Systems 30 (1998), pp. 509-518.

Barrett et al., "Intermediaries: An approach to manipulating information streams", IBM, 1999, IBM Systems Journal, vol. 38, No. 4, pp. 629-641.

Thompson et al., "Intermediary Architecture: Interposing Middleware Object Services between Web Client and Server" ACM, 1999, ACM Computing Surveys, vol. 31, Issue 2es, article No. 14.

"Plug-in" definition printed from Webopedia Computer Dictionary (www.webopedia.com), print date Aug. 9, 2004 , 1 page.

Barrett et al., "How to Personalize the Web," CHI 97, ACM, Mar. 22-27, 1997, pp. 75-82.

Co-pending U.S. Appl. No. 09/706,297, filed Nov. 3, 2000 entitled "Method and System for Modifying Script Portions of Requests for Remote Resources" by Theron Tock et al., 68 pages.

Hunt, "Internet/Intranet Firewall Security—Policy, Architecture and Transaction Services," Computer Communications, Butterworths and Co. Publishers Ltd., GB, vol. 21, No. 13, Sep. 1, 1998, pp. 1107-1123.

\* cited by examiner

METHOD AND SYSTEM FOR PROVIDING SECURE ACCESS TO PRIVATE NETWORKS

CROSS-REFERENCE TO RELATED APPLICATIONS

This application is a continuation of U.S. patent application Ser. No. 10/060,792, filed Jan. 29, 2002, which is a continuation-in-part of U.S. patent application Ser. No. 09/706,181, filed Nov. 3, 2000, which claims the benefit of U.S. Provisional Patent Application No. 60/235,513, filed Sep. 26, 2000, the entire contents of which are hereby incorporated herein by reference.

This application claims priority of U.S. Provisional Patent Application No. 60/350,097, filed Nov. 2, 2001, which is hereby incorporated herein by reference.

In addition, this application is related to U.S. patent application Ser. No. 10/060,525, filed Jan. 29, 2002 (now U.S. Pat. No. 7,146,403), which is hereby incorporated herein by reference.

BACKGROUND OF THE INVENTION

1. Field of the Invention

The present invention relates to client-server computing and, more particularly, to client-server computing for securely accessing resources over a network.

2. Description of the Related Art

Network browsers (browser applications), such as Netscape Navigator or Microsoft Explorer, allow users of client machines to request and retrieve resources from remotely located server machines via the Internet. These network browsers can display or render HyperText Markup Language (HTML) documents provided by the remotely located server machines. Additionally, browsers are able to execute script programs embedded in the HTML documents to provide some local functionality.

Conventionally, network browsers are used to access public networks, such as the Internet. Private networks are normally protected by firewalls so that network browsers residing on computing machines outside the private network are not able to gain access to any resources on the private network.

While firewalls are effective at protecting against external access to private networks, there is often the need for external persons or businesses to gain at least limited access to the private networks of other persons or businesses. For example, a supplier of parts to a business customer may be able to better serve their business customer by having access to information (e.g., inventory levels or orders) maintained on the private network of the business customer. One conventional approach is to allow the supplier's machine to access the private network through the firewall via a public network. This provides a "hole" in the firewall that seriously compromises the security of the private network. Hence, this conventional approach is normally not permitted if security is an important concern. Another conventional approach is to establish a Virtual Private Network (VPN) with the supplier's machine. Here, the supplier's machine is also able to access the private network through the public network and the firewall, but all data transmissions are encrypted. Some firewalls support VPNs and protocols providing the encrypted communications, such as Point-to-Point Tunneling Protocol (PPTP), can be used. While VPNs offer remote secure access, they are difficult to arrange, configure and manage. Each VPN must also be provided for each external person or business given access to the private network. Still further VPNs are costly and each VPN provides some security exposure to the entire private network.

Thus, there is a need for improved approaches to providing secure remote access to resources maintained on private networks.

SUMMARY OF THE INVENTION

The invention pertains to improved approaches for providing secure access to resources maintained on private networks. The secure access can be provided through a public network using a standard network browser. Multiple remote users are able to gain restricted and controlled access to at least portions of a private network through a common access point.

The invention can be implemented in numerous ways, including as a system, method, device, and a computer readable medium. Several embodiments of the invention are discussed below.

As a method for accessing resources on a private network via an intermediary server, one embodiment of the invention includes at least the acts of: receiving a login request from a user for access to the intermediary server; authenticating the user; subsequently receiving a resource request from the user at the intermediary server, the resource request requesting a particular operation with respect to a resource from the private network; obtaining access privileges for the user; determining whether the access privileges for the user permit the user to perform the particular operation at the private network; and preventing performance of the particular operation at the private network such that a response to the resource request is not had when it has been determined that the access privileges for the user do not permit the user to perform the particular operation at the private network.

As a method for providing remote access to a private network via an intermediary server, one embodiment of the invention includes at least the acts of: receiving a login request from a remote user for access to the intermediary server; determining whether the remote user is permitted access to the intermediary server; granting the remote user access to the intermediary server when it is determined that the remote user is permitted access, the granted access also carries access privileges to predetermined portions of the private network; subsequently receiving a resource request from the remote user at the intermediary server, the resource request requesting a particular resource; determining whether the resource request from the remote user is permitted by the access privileges; supplying the particular resource to the remote user when it is determined that the resource request from the user is permitted; and denying the remote user from access to the particular resource when it is determined that the resource request from the user is not permitted.

As an intermediary server system, one embodiment of the invention includes at least a web server, a protocol handler and a content transformer. The web server receives requests for resources from client machines via a network. The protocol handler receives the requests for resources, modifies the requests to be directed to appropriate remote servers via the private network, and forwards the modified requests for resources to the appropriate remote servers. The content transformer receives the resources supplied by the appropriate remote servers in response to the modified requests and modifies the resources such that at least certain links contained therein are modified to be directed to the intermediary server system instead of remote servers.

As a computer readable medium including at least computer program code for enabling access to resources on a private network via an intermediary server, one embodiment of the invention includes at least: computer code for receiving a resource request from a user at the intermediary server, the resource request requesting a particular operation with respect to a resource from the private network; computer code for obtaining access privileges for the user; computer code for determining whether the access privileges for the user permit the user to perform the particular operation at the private network; and computer code for preventing performance of the particular operation at the private network such that a response to the resource request is not had when said computer code for determining determines that the access privileges for the user do not permit the user to perform the particular operation at the private network.

As a computer readable medium including at least computer program code to facilitate access to a private network via an intermediary server, one embodiment of the invention includes at least: computer program code for receiving a login request from a user for access to the intermediary server; computer program code for determining whether the user is permitted access to the intermediary server; computer program code for granting the user access to the intermediary server when the computer program code for determining determines that the user is permitted access, the granted access also carries access privileges to predetermined portions of the private network; computer program code for subsequently receiving a resource request from the user at the intermediary server, the resource request requesting a particular resource; computer program code for determining whether the resource request from the user is permitted by the access privileges; computer program code for supplying the particular resource to the user when the computer program code for determining determines that the resource request from the user is permitted; and computer program code for denying the user from access to the particular resource when the computer program code for determining determines that the resource request from the user is not permitted.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved approaches for providing secure access to resources maintained on private networks. The secure access can be provided through a public network using a standard network browser. Multiple remote users are able to gain restricted and controlled access to at least portions of a private network through a common access point.

The solution can enable users, such as employees, contractors or partners, to access resources resident on a private network in a secure manner while being remotely located from a direct connection to the private network. The solution provided by the invention is not only easily set up and managed, but also able to support many remote users in a cost-effective manner.

Embodiments of this aspect of the invention are discussed below with reference to FIGS. 1A-17B. However, those skilled in the art will readily appreciate that the detailed description given herein with respect to these figures is for explanatory purposes as the invention extends beyond these limited embodiments.

Figure 1A:
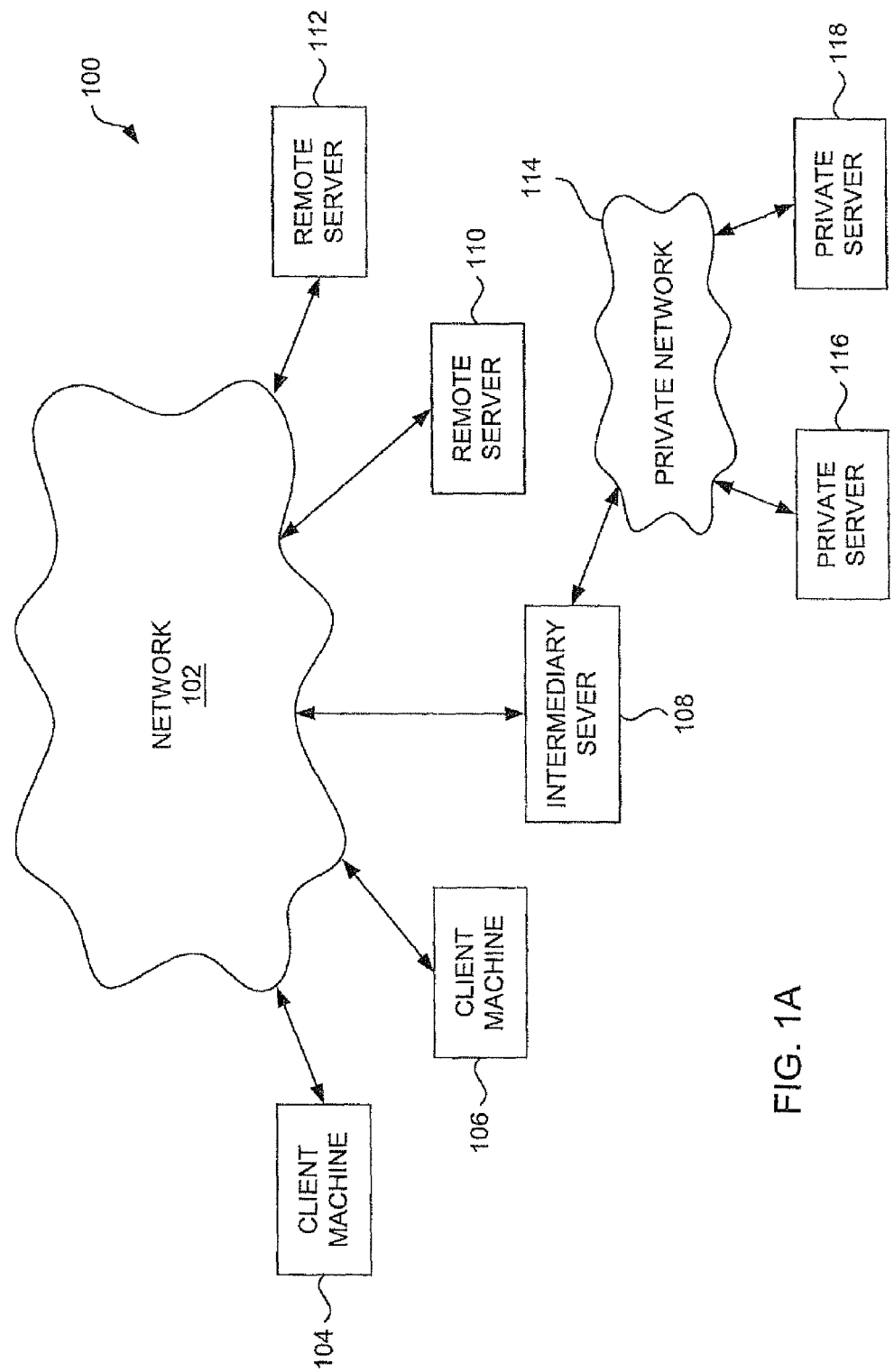
FIG. 1A is a block diagram of an information retrieval system according to one embodiment of the invention.

FIG. 1A is a block diagram of an information retrieval system 100 according to one embodiment of the invention. The information retrieval system 100 includes a network 102, client machines 104 and 106, an intermediary server 108, remote servers 110 and 112, a private network 114, and private servers 116 and 118. The network 102 serves as a communication medium through which the client machines 104 and 106, the intermediary server 108 and the remote servers 110 and 112 can communicate. The network 102 is, for example, a data network which can include the Internet, a wide area network, or a local area network. The Internet refers to a global network of interconnected computers. The private network 114 also serves as a communication medium through which the intermediary server 108 and the private servers 116 and 118 can communicate. The network 114 is also a data network. Often the private network 114 is associated with an entity and thus employees operating computing devices on the private network 114 are able to communicate with the private servers 116 and 118. For example, the private network 114 can be referred to as a corporate network or an intranet. However, access to the private network 114 by an outside computing device is typically limited by a firewall (not shown). The intermediary server 108 is permitted to communicate with the private network 114 through the firewall. Here, to the extent a client machine (requestor) is authorized and permitted, the intermediary server 108 communicates with the private network 114 on behalf of the client machine (requestor). The intermediary server 108, in effect, controls the extent to which it allows outside computing devices to access the private network 114.

According to the invention, requests for content residing on the private servers 116 and 118 can be received from the client machines 104 and 106. As used herein, "content" is any information or resource that can be stored on a server and retrieved by a client. Typically, the content is embodied as an electronic file and contains text and/or images. Often, the client machines 104 and 106 operate browser applications that facilitate requesting and retrieval of content over the network 102 and the private network 114. In such cases, the content is often returned to the browser application as a browser-viewable document (e.g., markup language document, webpage, etc.) so that the browser application can display the same. The client machines 104 and 106 communicate with an intermediary server 108. Initially, the intermediary server 108 determines whether the client machines 104 and 106 seeking the content are authenticated and permitted such access to the private network 114. Following successful authentication and permission verifications, the intermediary server 108 then, in turn, accesses the private servers 116 and 118 residing on the private network 114 on behalf of the client machines 104 and 106. Once the intermediary server 108 obtains the requested content from the private servers 116 and 118, the intermediary server 108 can directly return the requested content to the client machines 104 and 106 or can first modify the requested content and then deliver it to the client machines 104 and 106.

The modification to the requested content by the intermediary server 108 can take a variety of forms. As one example, the intermediary server 108 can insert a toolbar into the requested content before delivery to the client machines 104 and 106. As another example, the intermediary server 108 can alter the hyperlinks within the requested content so as to point to an intermediary server (e.g., the intermediary server 108). Various other tasks can be performed on the requested content by the intermediary server 108. Additionally, the information retrieval system 100 can also support centralized storage at the intermediary server 108 of server stored information. The server stored information is often referred to as "cookies," though cookies are conventionally stored on client machines.

Although the information retrieval system 100 illustrated in FIG. 1A depicts only a pair of client machines, a pair of remote servers, a single intermediary server and a pair of private servers, it should be understood that the information retrieval system 100 can support many client machines and many server machines. It should also be understood that the information retrieval system 100 can also support multiple intermediary servers.

Figure 1B:
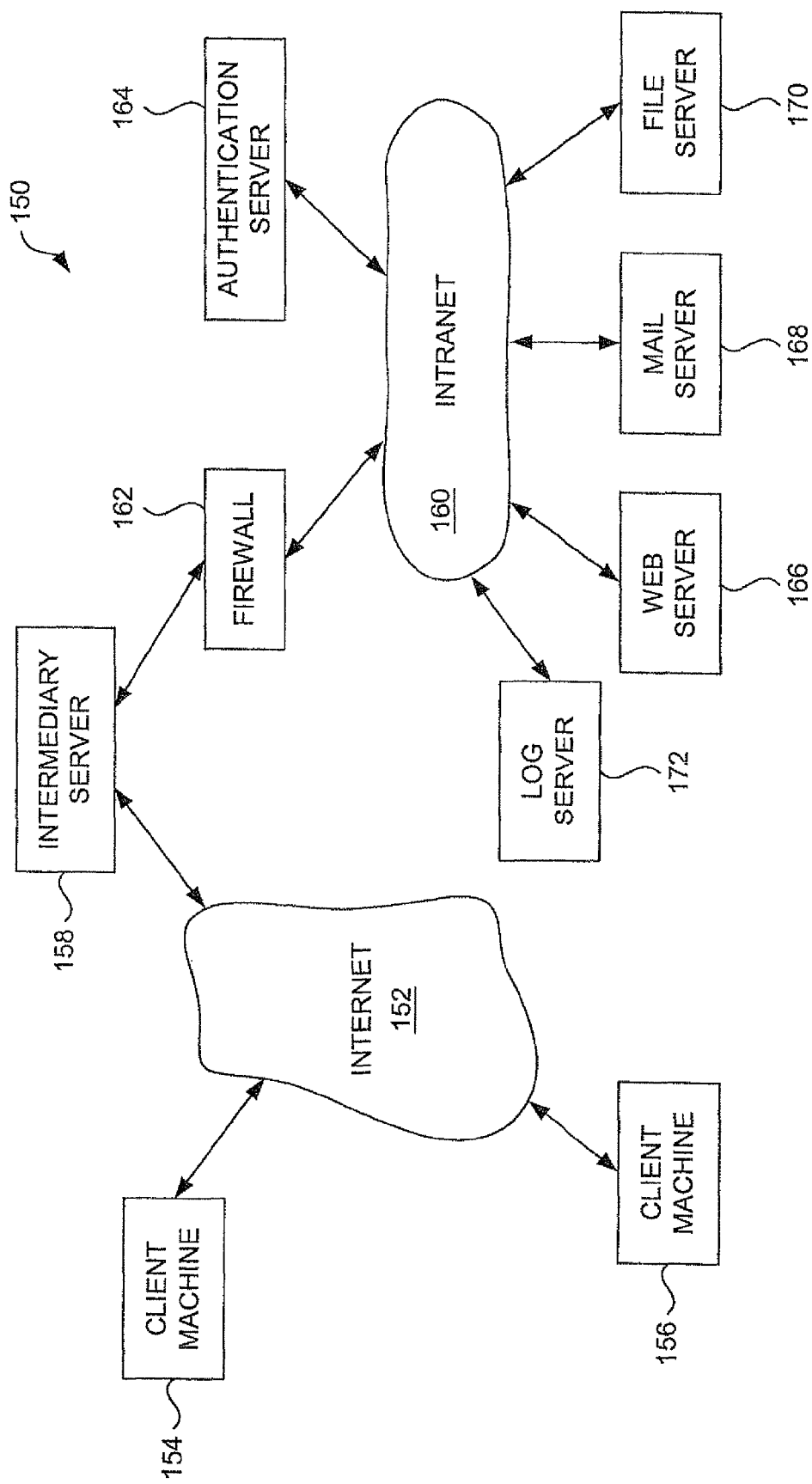
FIG. 1B is a block diagram of an information retrieval system according to another embodiment of the invention.

FIG. 1B is a block diagram of an information retrieval system 150 according to one embodiment of the invention. The information retrieval system 150 is, for example, a more detailed implementation of the information retrieval system 100 illustrated in FIG. 1A.

The information retrieval system 150 makes use of the Internet 152 and client machines 154 and 156 that couple to the Internet 152 through wired or wireless means. Typically, the client machines 154 and 156 operate client-side applications, such as a network browser or a mail application. When requestors (users) of the client machines 154 and 156 desire to access remote resources, resource requests are sent from the client machines 154 and 156 through the Internet 152 to an intermediary server 158. Typically, the communications between the client machines 154 and 156 and the intermediary server 158 are secured by an encryption technique (e.g., Secure Socket Layer (SSL)). The intermediary server 158 provides access to an intranet 160. The resources being requested by the client machines 154 and 156 reside within the intranet 160. Since a firewall typically limits or precludes external access to the intranet 160, the intermediary server 158 must be permitted to communicate with the intranet through the firewall 162. The intranet 160 typically includes various different types of resources that can be accessed electronically. Typically, these resources are stored on server machines that couple to, or form part of, the intranet. As shown in FIG. 1B, the intranet 160 couples to, or includes, an authentication server 164, a web server 166, a mail server 168, a file server 170 and a log server 172. Hence, a given client machine can access any one of the servers 164-172 residing within or on the intranet 160 by way of the intermediary server 158. Consequently, a given client machine can request and receive resources residing on the web server 166 using a network browser application. As another example, the given client machine can access the mail resources residing on the mail server 168 using a client-side mail application. As still another example, the given client machine can access the file server 170 residing within or on the intranet 160 to obtain, store or view electronic files thereon.

The intermediary server 158 is configured to ensure that access to the intranet 160 via the intermediary server 158 remains protected. In this regard, the requestors that are seeking to access resources or content residing on the intranet 160 must be authenticated. The authentication can utilize the authentication server 164 residing within or on the intranet 160. In this regard, native authentication techniques utilized by the intranet 160 can be used in authenticating a requestor at the intermediary server 158. Still further, the intermediary server 158 can be configured by an administrator such that different requestors (e.g., users of client machines) can be given different access privileges to different resources (e.g., servers) within or on the intranet 160. The log server 172 allows the storage of log information pertaining to access requests to the intranet 160 at the intermediary server 158. The log information can be provided on an application level basis such that it is more user-discernable.

Figure 2A:
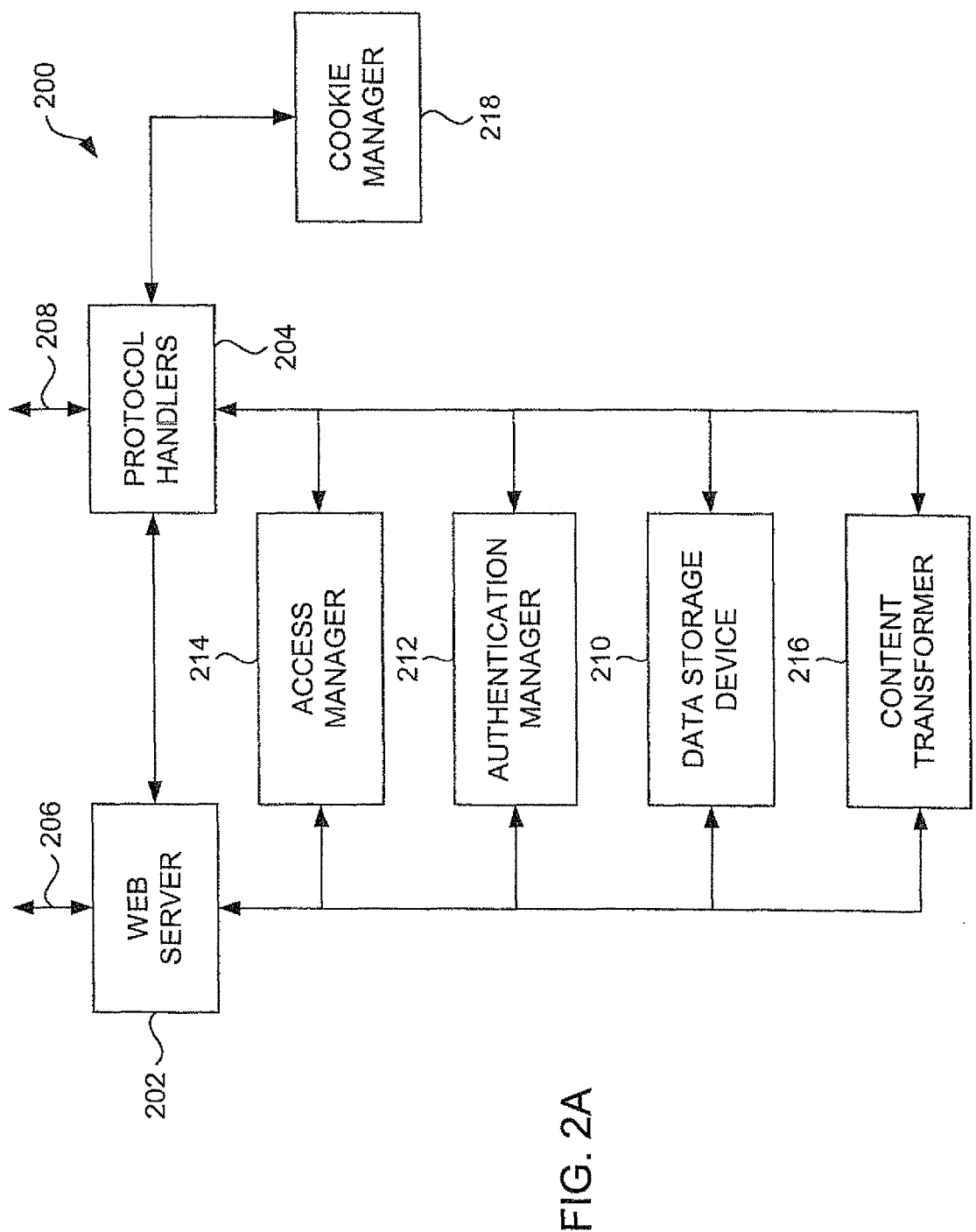
FIG. 2A is a block diagram of an intermediary server according to one embodiment of the invention.

FIG. 2A is a block diagram of an intermediary server 200 according to one embodiment of the invention. The intermediary server 200 is, for example, suitable for use as the intermediary server 108 illustrated in FIG. 1.

The intermediary server 200 includes various processing modules typically implemented by computer program code executed by a processing device utilized by the intermediary server. More particularly, the processing modules of the intermediary server 200 include a web server 202 and a protocol handler 204. The web server 202 couples to client machines through a link 206 (via a network) and the protocol handler 204 couples to remote servers through a link 208 (via a network). The web server 202 and the protocol handler 204 also communicate with one another as well as with various supporting modules and a data storage device 210. The data storage device 210 provides persistent or non-volatile storage for various data items being maintained by the intermediary server 200. Typically, for each user or requestor associated with a client machine, the data storage device provides separate storage.

The processing modules include an authentication manager 212 and an access manager 214. The authentication manager 212 manages authentication processing which serves to determine whether the requestor is who they say they are. The authentication processing can be local or external to the intermediary server 200. For example, external authentication can be provided by an authentication server within a private network (e.g., authentication server 164). The access manager 214 provides access limitations to the various resources on the private network. Namely, different requestors can be assigned different levels, types or areas of access privileges. For example, requestor A can access server X but not servers Y and Z, and requestor B can access server Y for read-only and not servers X and Z.

The intermediary server 200 also includes a content transformer 216, which is another processing module that is used to parse requested content received from a remote server and then modify the content in predetermined ways.

Another processing module that the intermediary server 200 might include is a cookie manager 218. The cookie manager manages "cookies" such that those being received from a remote server are stored to the data storage device 210 and those "cookies" previously stored in the data storage device 210 are delivered to the remote server at appropriate times. More generally, "cookies" refer to server stored information. Such server stored information is often set by a remote server and used for session, state or identification purposes.

Figure 2B:
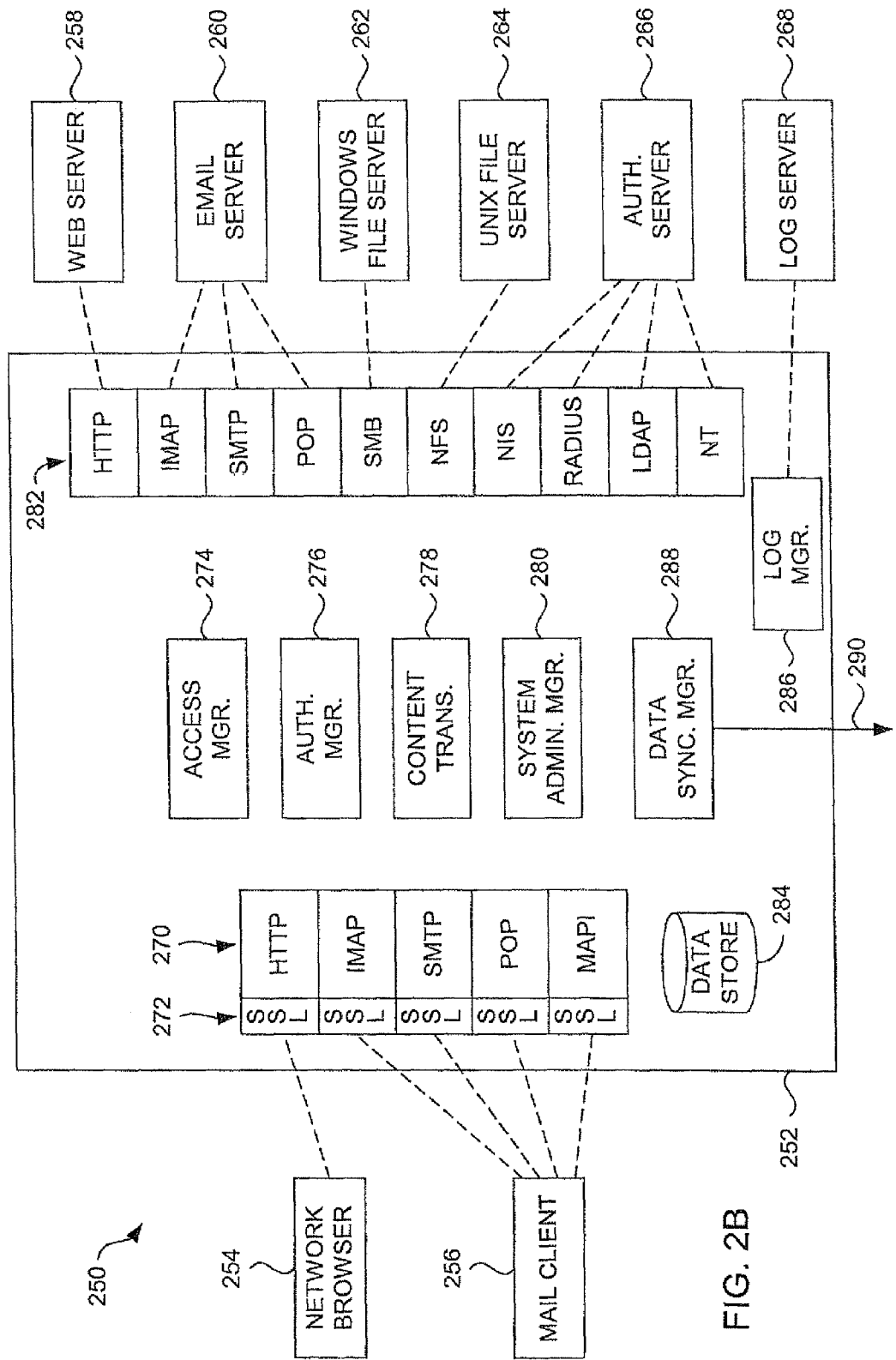
FIG. 2B is a block diagram of a remote access system according to one embodiment of the invention.

FIG. 2B is a block diagram of a remote access system 250 according to one embodiment of the invention. The remote access system 250 operates in a client-server environment to allow users of clients to gain access to resources at remote servers. In particular, the remote access system 250 includes a network browser 254 and a mail client 256. The network browser 254 and the mail client 256 are client applications that operate or run on client machines. Typically, a user or requestor will interact with these one or more client programs to request resources located on the remote servers. The network browser 254 and the mail client 256 couple to an intermediary server 252 over secure links or connections. The intermediary server 252 also couples to the remote servers through either secure or unsecure connections or links. The intermediary server 252 can support connections to various different servers, such as servers found on private networks. One example of a private network is a corporate network. The servers illustrated in FIG. 2B include a web server 258, an email server 260, a Windows file server 262, a UNIX file server 264, an authentication server 266 and a log server 268.

The intermediary server 252 includes a Secure Socket Layer (SSL) 272 that provides encryption handling for the connection or link with the client applications prior to reaching a front-end protocol handler layer 270. The front-end protocol handler layer 270 includes a plurality of protocol handlers to handle the different types of incoming protocols that may be utilized by the various client applications. As shown in FIG. 2B, the front-end protocol handler layer 270 includes separate protocol handlers for the protocols of HTTP, IMAP, SMTP, POP, and MAPI. After the appropriate protocol handler has been utilized for an incoming request, other functional modules within the intermediary server 252 can then be utilized. In particular, an access manager 274 can determine whether the requestor associated with the incoming request is permitted the type of access being requested. An authentication manager 276 can determine whether the requestor is able to be authenticated. A content transformer 278 can perform transformation of the content of the received request or the requested response provided by the remote server. A system administration manager 280 allows a system administrator to interact with the intermediary server 252 to configure access privileges, system configuration and login features.

The intermediary server 252 also includes back-end protocol handlers 282. The back-end protocol handlers 282 provide the appropriate protocol for outgoing and incoming communications with respect to a particular server. The layer of back-end protocol handlers shown in FIG. 2B includes protocol handlers for the protocols of: HTTP, IMAP, SMTP, POP, SMB, NFS, NIS, RADIUS, LDAP, and NT. To the extent that an incoming protocol to the intermediary server 252 differs from an outgoing protocol from the intermediary server 252, the content transformer 278 can perform the protocol transformations (e.g., translations). Still further, the intermediary server 252 includes a data store 284, a log manager 286, and a data synchronization manager 288. The data store 284 can provide temporary or semi-permanent data storage for the various components of the intermediary server 252. For example, a local record for authentication purposes can be stored for each of the clients or requestors in the data store 284. In addition, session identifiers, or cookies, for the clients or requestors can also be stored in a centralized fashion in the data store 284. The data synchronization manager 288 is a module that enables coupling of one intermediary server with another intermediary server to provide fault tolerance. Hence, if one intermediary server fails, then, through a link 290, the failing intermediary server can couple to an operating intermediary server to provide some or all of the operations typically associated with an intermediary server. The log manager 286 is provided to enable application level logging of various access requests that are made through the intermediary server 252. The log formed by the log manager 286 is stored in the log server 268.

Figure 3:
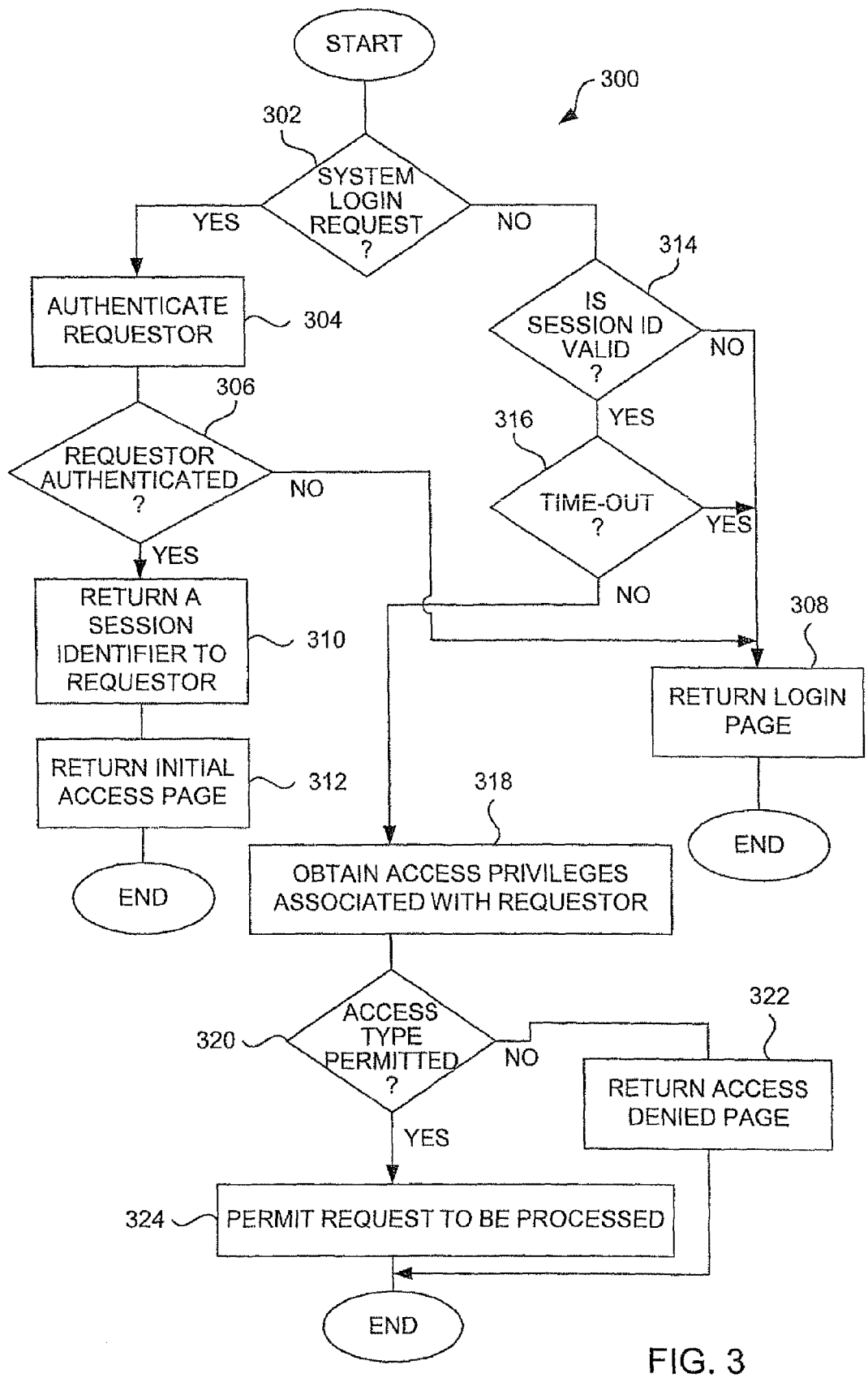
FIG. 3 is a flow diagram of request processing according to one embodiment of the invention.

FIG. 3 is a flow diagram of request processing 300 according to one embodiment of the invention. The request processing 300 is invoked whenever a request from a requestor is received by an intermediary server, such as the intermediary server 108 illustrated in FIG. 1A, the intermediary server 158 illustrated in FIG. 1B, the intermediary server 200 illustrated in FIG. 2A or the intermediary server 252 illustrated in FIG. 2B.

The request processing 300 begins with a decision 302 that determines whether the received request is a system login request. When the decision 302 determines that the received request is a system login request, then the request processing 300 attempts to authenticate 304 the requestor. The authentication can be performed locally or remotely. Additional details on authentication are provided below. Thereafter, a decision 306 determines whether the requestor has been authenticated. When the decision 306 determines that the requestor cannot be authenticated, then the login attempt fails and a login page can be returned 308 to the requestor. The login page facilitates login retry by the requestor. Following the operation 308, the request processing 300 is complete and ends for the case in which the login request failed.

Alternatively, when the decision 306 determines that the requestor is authenticated, then a session identifier is returned 310 to the requestor. The requestor can refer to a client device or the user of the client device depending on context. The session identifier is used in subsequent requests to the intermediary server as long as the session is active. Additionally, an initial access page is returned 312 to the requestor. From the initial access page, the requestor is able to access various resources available on a private network. Following the operation 312, the request processing 300 is complete and ends for the case in which the login request was successful.

Besides the processing of login requests, the request processing 300 also operates to process all other requests for remote access via the intermediary server. Hence, when the decision 302 determines that the received request is not a system login request, then a decision 314 determines whether the received request has a valid session identifier. The received request would have a valid session identifier if the requestor has already been authenticated (i.e., logged into the intermediary server) and the session is still valid. Hence, when the decision 314 determines that the session identifier associated with the received request is not valid, then access to the intermediary server is denied and the login page can be returned 308 to the requestor. Alternatively, when the decision 314 determines that the session identifier is valid, then a decision 316 determines whether the session has timed-out. When the decision 316 determines that the session has timed-out, then access to the intermediary server is denied and the login page can be returned 308 to the requestor. Here, if the requestor has an invalid session identifier or the session has timed-out, the requestor is forced to login to be authenticated.

On the other hand, when the decision 316 determines that the session has not timed-out, then the requestor is permitted to access the private network via the intermediary server. Thereafter, depending upon the type of access the requestor is seeking to make, additional processing is performed to ensure that the requestor gains access to only those resources deemed appropriate and intended. In particular, with respect to the request processing 300, access privileges associated with the requestor are obtained 318. The access privileges indicate which resources the requestor is entitled to access. Next, a decision 320 determines whether the particular access type associated with the received request is permitted. When the decision 320 determines that the access type associated with the received request is not permitted, then an access denied page is returned 322 to the requestor. Alternatively, when the decision 320 determines that the access type of the received request is permitted, then the received request is permitted 324 to be processed. Here, the processing of the received request enables the requestor to access (e.g., view, retrieve, etc.) the protected resources from the private network. Following the operations 322 and 324, the request processing 300 is complete and ends with the received request having been processed only when access is deemed permitted.

Figure 4:
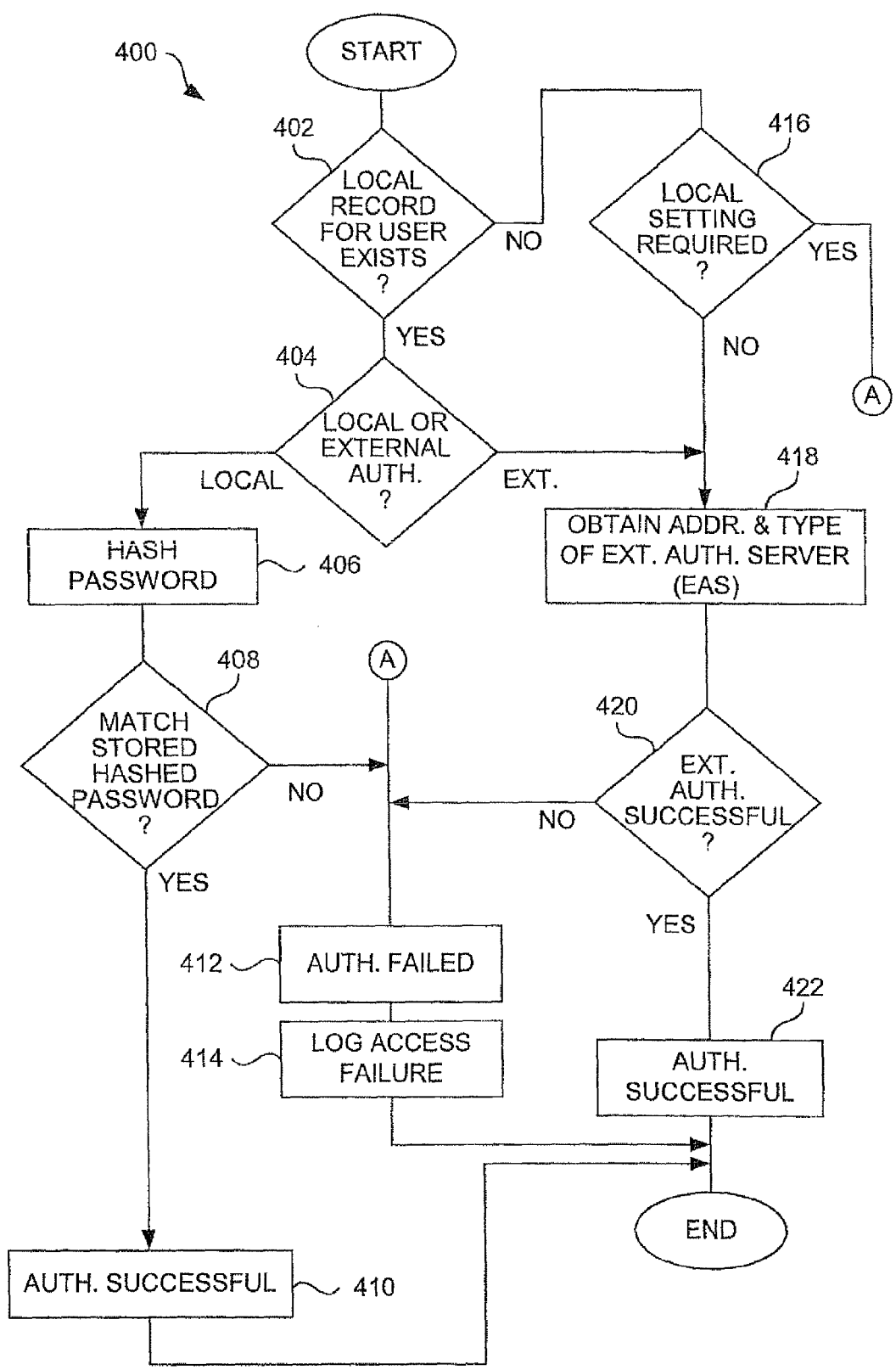
FIG. 4 is a flow diagram of authentication processing according to one embodiment of the invention.

FIG. 4 is a flow diagram of authentication processing 400 according to one embodiment of the invention. The authentication processing 400 is, for example, processing associated with the authentication operation 304 illustrated in FIG. 3.

The authentication processing 400 begins with a decision 402 that determines whether a local record for the requestor (user) exists. When the decision 402 determines that a local record for the requestor does exist, then a decision 404 determines whether local or external authentication is required. Here, the local record indicates whether local or external authentication should be performed. Besides an indication of whether local or external authentication should be performed, a local record can also store other useful information, for example, requestor's (user's) name, time last logged in, account status, etc. When the decision 404 determines that local authentication is to be performed, a password provided with the login request being processed for authentication is hashed 406. Hashing is the transformation of a string of characters into another string of characters referred to as a "key" that represents the original string. A hash function can perform the hashing operation. Hashing is often performed in the encryption and decryption context.

Next, a decision 408 determines whether the hashed password matches a stored hash password. When the decision 408 determines that a match is present, then the authentication is deemed successful 410. Alternatively, when the decision 408 determines that a match is not present, then the authentication is deemed to have failed 412. Further, when the decision 408 determines that there is no match, then an access failure can also be logged 414 in a log. In one embodiment, the log can be provided by a log server. The logging 414 of the access failure can provide application-level information that facilitates understanding of the nature of the access failure that occurred when later viewing the log. Following the operations 410 and 414, the authentication processing 400 is complete and ends with the authentication either succeeding or failing depending on whether the login request contains the correct password.

Figure 7:
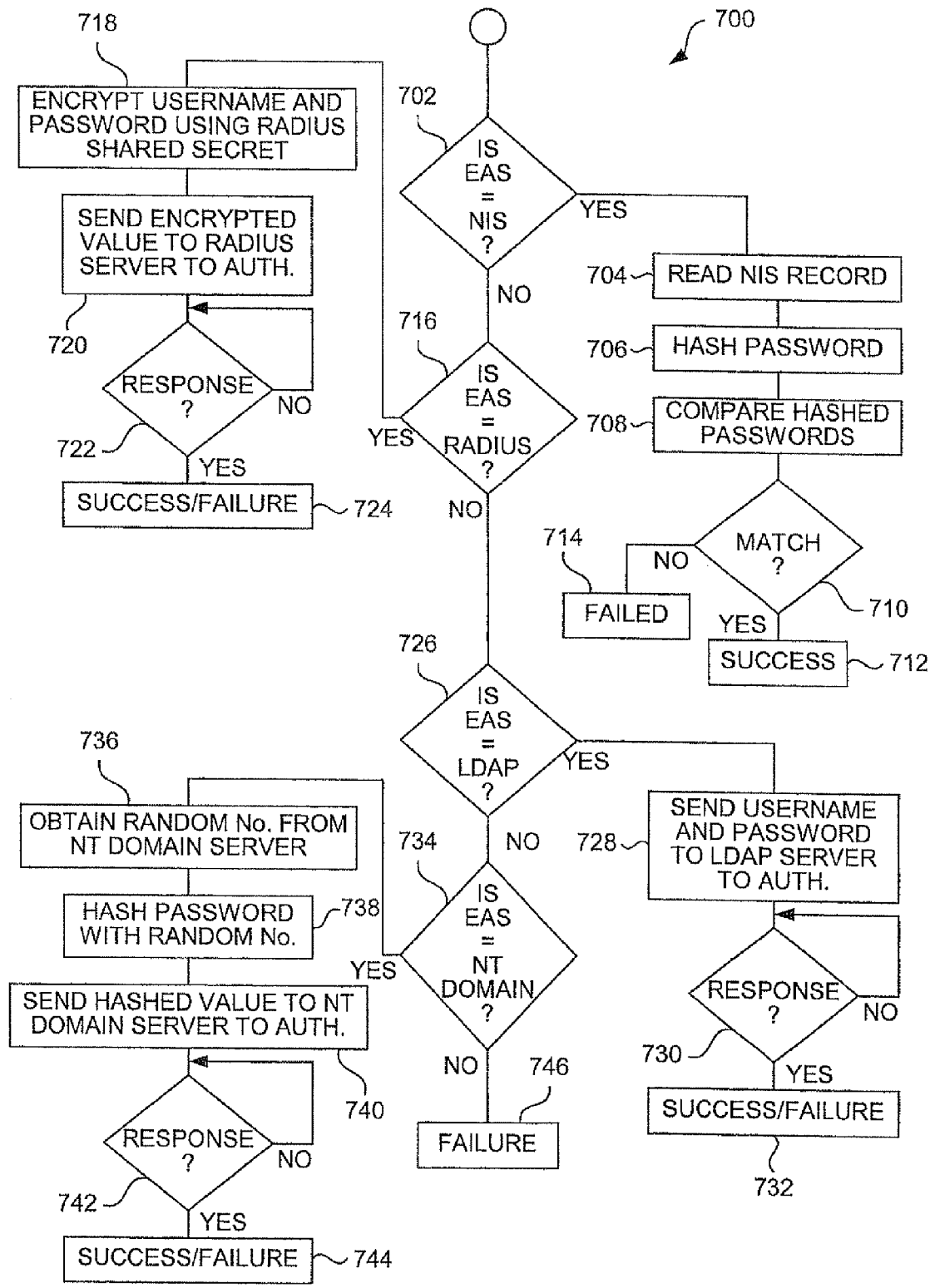
FIG. 7 is a flow diagram of detailed external authentication processing according to one embodiment of the invention.

On the other hand, when the decision 402 determines that a local record for the requestor does not exist, then a decision 416 determines whether a local setting is required. A system setting can be used to indicate whether or not a local record is required. An administrator can use such a system setting to limit access to only those users having local records. When the decision 416 determines that a local setting is required, then the authentication is deemed to have failed 412 because there is no available local record. Again, the access failure can be logged 414. Alternatively, when the decision 416 determines that a local setting is not required, or when the decision 404 determines that external authentication is to be performed, then an address and type of external authentication server (EAS) to be used for the authentication are obtained 418. Different processing is typically performed with different types of external authentication servers. Normally, these external authentication servers are already provided within the private network for purposes of performing authentications. Typically, there is a system setting that indicates a particular external authentication server to be used. Hence, the authentication processing 400 can make use of the native authentication provided by such external authentication servers. The discussion below pertaining to FIG. 7 provides additional detail on different types of external authentications.

Next, a decision 420 determines whether the external authentication has been successful. Here, external authentication is performed depending upon the particular type of external authentication that has been indicated. When the decision 420 determines that external authentication is not successful, then the authentication is deemed to have failed 412. Additionally, the access failure can be logged 414 as previously discussed. On the other hand, when the decision 420 determines that the external authentication has been successful, then the authentication is deemed to be successful 422. Following the operation 422, the authentication processing 400 is complete and ends with the requestor being authenticated.

Figure 5:
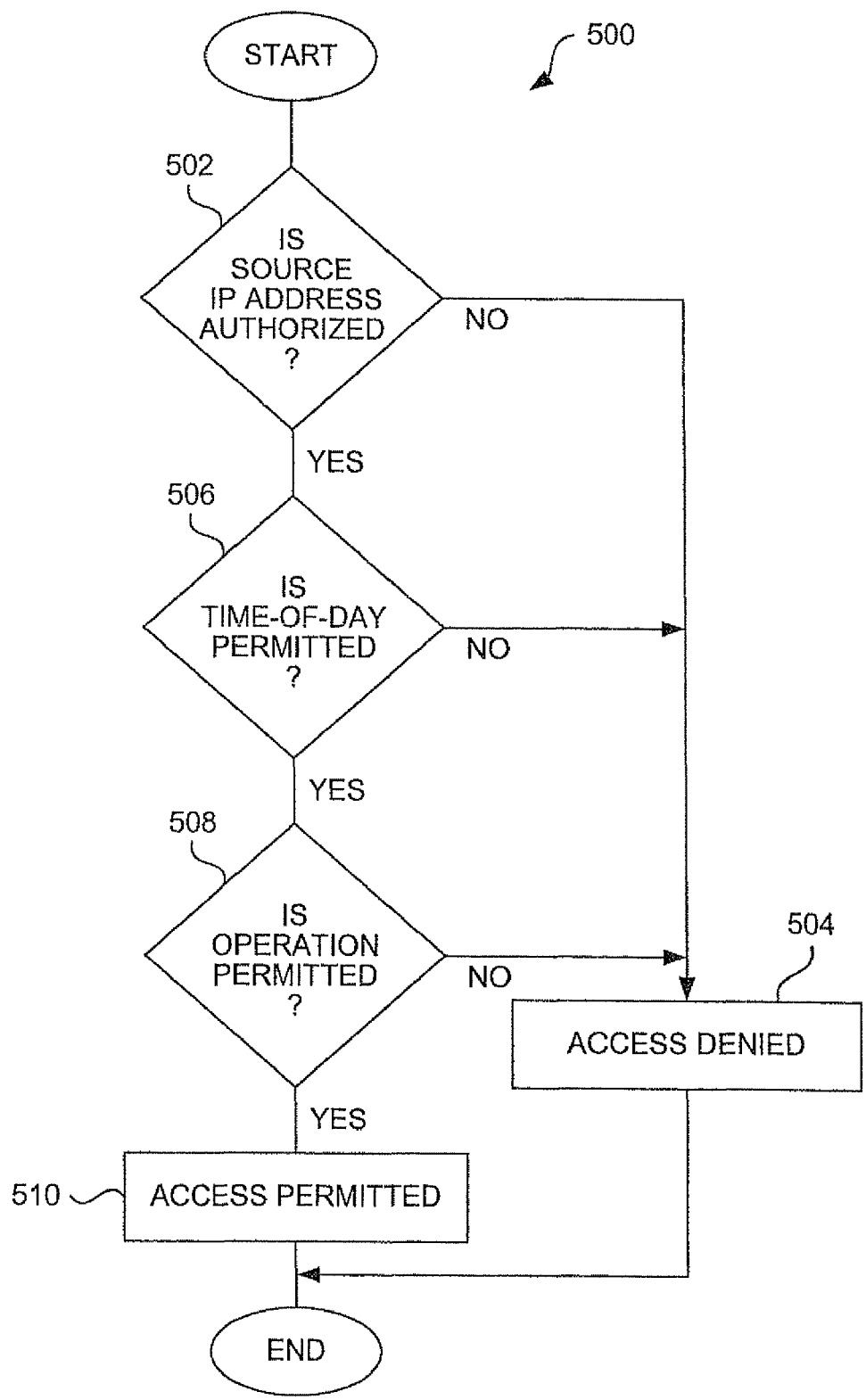
FIG. 5 is a flow diagram of access privilege processing according to one embodiment of the invention.

FIG. 5 is a flow diagram of access privilege processing 500 according to one embodiment of the invention. The access privilege processing 500 is, for example, processing performed by the decision 320 of FIG. 3. Namely, the access privilege processing 500 determines whether the access type being requested is permitted by a particular requestor. In effect, the access type provides various criteria that can be used to limit access by requestors. With respect to the embodiment shown in FIG. 5, the criteria includes source Internet Protocol (IP) address, time-of-day, and operations.

The access privilege processing 500 begins with a decision 502 that determines whether the source IP address associated with the received request (i.e., the requestor) is authorized. When the decision 502 determines that the source IP address associated with the received request is not authorized, then the access privilege processing 500 denies access 504. Here, to reduce risk of unauthorized access, the access privilege processing 500 ensures that only those IP addresses of known requestors are able to access the private resources.

When the decision 502 determines that the source IP address is authorized, then a decision 506 determines whether the time at which the request is being made satisfies a time-of-day access limitation. Typically, this limitation can be configured for all requestors or separately for each requestor. Here, the intermediary server can be configured, if desired, to permit access to private resources only during certain time periods. This, for example, can permit access only during business hours or other limited hours. When the decision 506 determines that the time of the received request is not within the time-of-day permitted, then the access privilege processing 500 denies access 504.

When the time associated with the received request is determined 506 to be within the time-of-day permitted, a decision 508 determines whether the particular operation associated with the received request is permitted. Here, the incoming request can request various different operations to be performed with respect to the private resources. These various different operations tend to vary with type of application being provided. The decision 508 can operate to limit the operations permitted to be used by different requestors. When the decision 508 determines that the operation being requested is not permitted, then access is denied 504. On the other hand, when the decision 508 determines that the requested operation is permitted, then access is permitted 510. Following the operations 504 and 510, the access privilege processing 500 is complete and ends.

Figure 6:
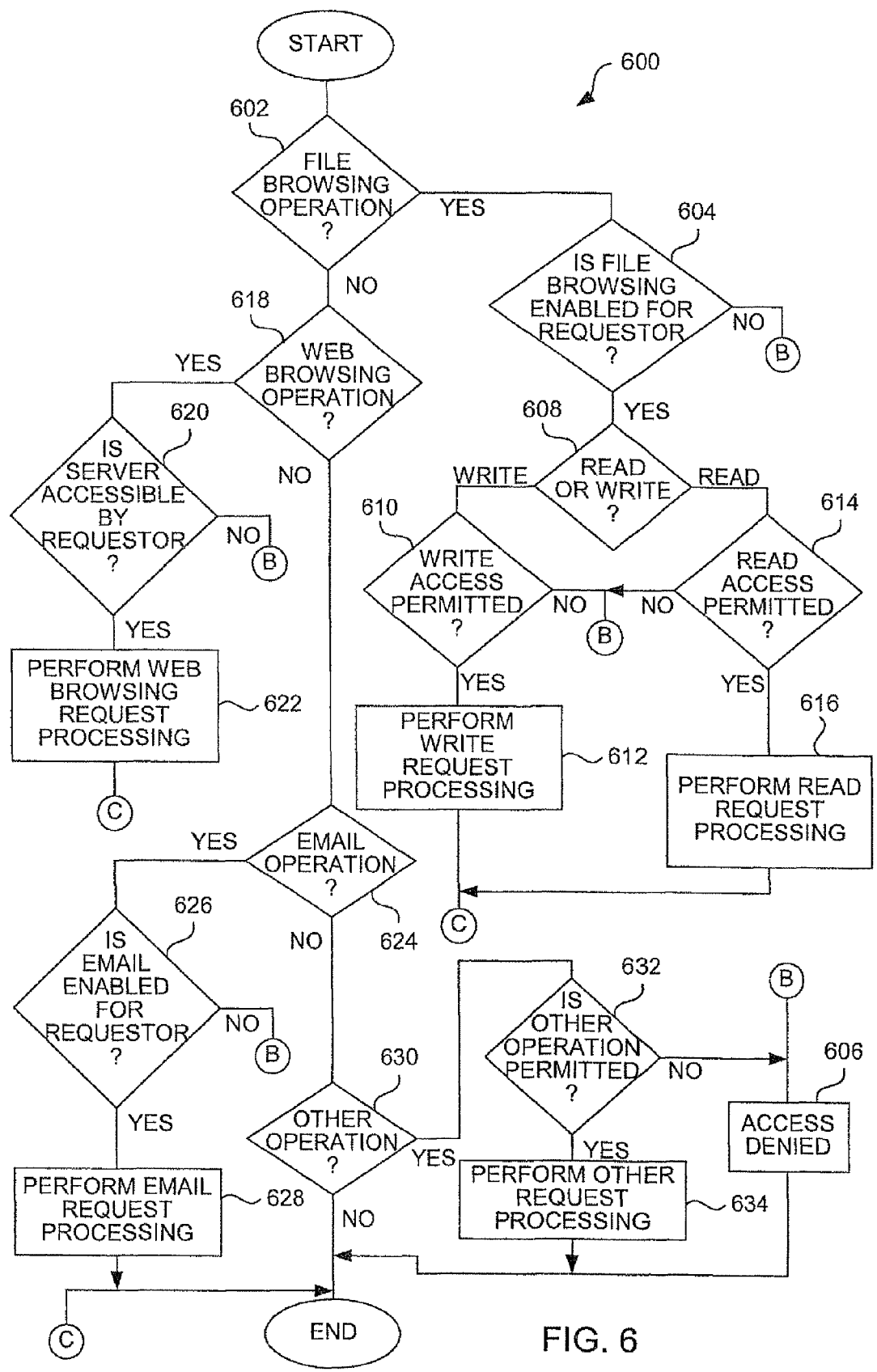
FIG. 6 is a flow diagram of operational privilege processing according to one embodiment of the invention.

FIG. 6 is a flow diagram of operational privilege processing 600 according to one embodiment of the invention. The operational privilege processing 600 is, for example, performed by the decision 508 illustrated in FIG. 5. It should also be noted that the operational privilege processing 600 performs the requested operation when such operation is determined to be permitted, and thus can be associated with the operations 320 and 324 of FIG. 3.

The operational privilege processing 600 begins with a decision 602 that determines whether a file browsing operation has been requested. When the decision 602 determines that a file browsing operation has been requested, then a decision 604 determines whether file browsing is enabled for the requestor. When the decision 604 determines that file browsing is not enabled for the requestor, then access is denied 606 and thus the operational privilege processing 600 ends. Alternatively, when the decision 604 determines that file browsing is enabled for the requestor, then a decision 608 determines whether a read or write operation is being requested. When the decision 608 determines that a write operation is requested, a decision 610 determines whether write access is permitted. In one embodiment, the decision 610 determines whether write access is permitted by the particular requestor making the request. When the decision 610 determines that write access is not permitted, then access is denied 606 and thus the operational privilege processing 600 ends. Alternatively, when the decision 610 determines that write access is permitted, then write request processing is performed 612 to carry out the received request. Following the operation 612, the operational privilege processing 600 ends with the requested operation having been performed.

On the other hand, when the decision 608 determines that a read operation is being requested, a decision 614 determines whether read access is permitted. In one embodiment, the decision 614 determines whether read access is permitted by the particular requestor making the request. When the decision 614 determines that read access is not permitted, then access is denied 606. Alternatively, when the decision 614 determines that read access is permitted, then read request processing is performed 616 to carry out the requested operation. Following the operation 616, the operational privilege processing 600 is complete and ends with the requested operation having been performed.

On the other hand, when the decision 602 determines that the requested operation is not a file browsing operation, a decision 618 determines whether the requested operation is a web browsing operation. When the decision 618 determines that the requested operation is a web browsing operation, a decision 620 determines whether the server associated with the web browsing operation is accessible to the requestor. When the decision 620 determines that the server is not accessible to the requestor, then access is denied 606. In one embodiment, the intermediary server can maintain a list of servers that are accessible by particular requestors. This enables the intermediary server to control the resources that particular requestors are able to browse by server names. For example, although a private network may include numerous servers, requestors are able to be individually restricted to accessing only certain servers. Alternatively, when the decision 620 determines that the server associated with the web browsing operation is accessible to the requestor, then the web browsing request processing is performed 622. In other words, the requested web browsing operation is performed 622 because the requestor was entitled to access the particular server. Following the operation 622, the operational privilege processing 600 ends with the requested operation having been performed.

On the other hand, when the decision 618 determines that the requested operation is not a web browsing operation, then a decision 624 determines whether the requested operation is an email operation. When the decision 624 determines that the requested operation is an email operation, then a decision 626 determines whether email (electronic mail) is enabled for the requestor. When the decision 626 determines that email is not enabled for the requestor, then access is denied 606. Here, the intermediary server is able to control access to email operations by particular requestors. Alternatively, when the decision 626 determines that email is enabled for the requestor, the email request processing is performed 628. In other words, the requested email operation is performed because the requestor had suitable privileges to perform the operation. Following the operation 628, the operational privilege processing 600 ends with the requested operation having been performed.

Still further, when the decision 624 determines that the requested operation is not an email operation, then a decision 630 determines whether the requested operation is some other operation that is permitted by the intermediary server. Here, the other operation can be any suitable operation that is facilitated by the intermediary server. In effect, the other operation can represent a generic operation that is available on the intermediary server. The other operation can also refer to a local operation being performed by the intermediary server without access to a private network. Examples of local operations can vary widely but can include: adding bookmarks, adding, editing or deleting local records, altering file shares, etc. However, the other operation could also be an operation performed within the private network. When the decision 630 determines that the requested operation is one of the other operations, then a decision 632 determines whether the other operation is permitted. When the decision 632 determines that the requested operation is not one of the other operations that are permitted, then access is denied 606. Alternatively, when the decision 632 determines that the other operation is permitted, then the other request processing is performed 634. Following the operation 634, the operational privilege processing 600 is complete and ends with the other type of operation having been performed.

On the other hand, when the decision 630 determines that the requested operation is not one of the other operations that are permitted (by the requestor), then the operational privilege processing 600 ends without having performed the requested operation. Here, since the requested operation was unsupported by the operational privilege processing 600, the requested operation is not processed (i.e., it is blocked) at the intermediary server.

FIG. 7 is a flow diagram of detailed external authentication processing 700 according to one embodiment of the invention. The detailed external authentication processing 700 is, for example, detailed processing associated with the decision 420 illustrated in FIG. 4. The detailed external authentication processing 700 supports a variety of different types of external authentication systems, including: Network Information System (NIS), Remote Authentication Dial-In User Service (RADIUS), Lightweight Directory Access Protocol (LDAP), and NT domain. Hence, the external authentication performed for the intermediary server can use any of a variety of native authentication approaches that a private network might provide.

The detailed external authentication processing 700 begins with a decision 702 that determines whether the external authentication server (EAS) is NIS. When the external authentication server is NIS, then a NIS record is read 704. Then, the password provided with the login request is hashed 706. The hashed password is compared 708 with that provided within the NIS record. A decision 710 then determines whether the hashed passwords match. When the passwords do match, the authentication succeeds 712. When the passwords do not match, the authentication fails 714.

On the other hand, when the decision 702 determines that the external authentication server is not NIS, a decision 716 determines whether the external authentication server is RADIUS. When the external authentication server is RADIUS, then the username and password provided with the login request are encrypted 718 using a RADIUS shared secret. The RADIUS shared secret is typically a shared key. Then, the encrypted value is sent 720 to the RADIUS server for authentication. A decision 722 then determines whether a response from the RADIUS server has been received. The response, when received, indicates 724 success or failure of the authentication.

On the other hand, when the decision 716 determines that the external authentication server is not RADIUS, then a decision 726 determines whether the external authentication server is LDAP. When the decision 726 determines that the external authentication server is LDAP, the username and password provided with the login request are sent 728 to the LDAP server for authentication. A decision 730 then determines whether a response from the LDAP server has been received. The response, when received, indicates 732 success or failure of the authentication.

On the other hand, when the decision 726 determines that the external authentication server is not LDAP, a decision 734 determines whether the external authentication server is NT domain (NT domain server). When the decision 734 determines that the external authentication server is NT domain, a random number is obtained 736 from the NT domain server. Then the password provided with the login request is hashed 738 with the random number. Next, the hashed value is sent 740 to the NT domain server for authentication. A decision 742 then determines whether a response from the NT domain server has been received. The response indicates 744 success or failure of the authentication.

Figure 8A:
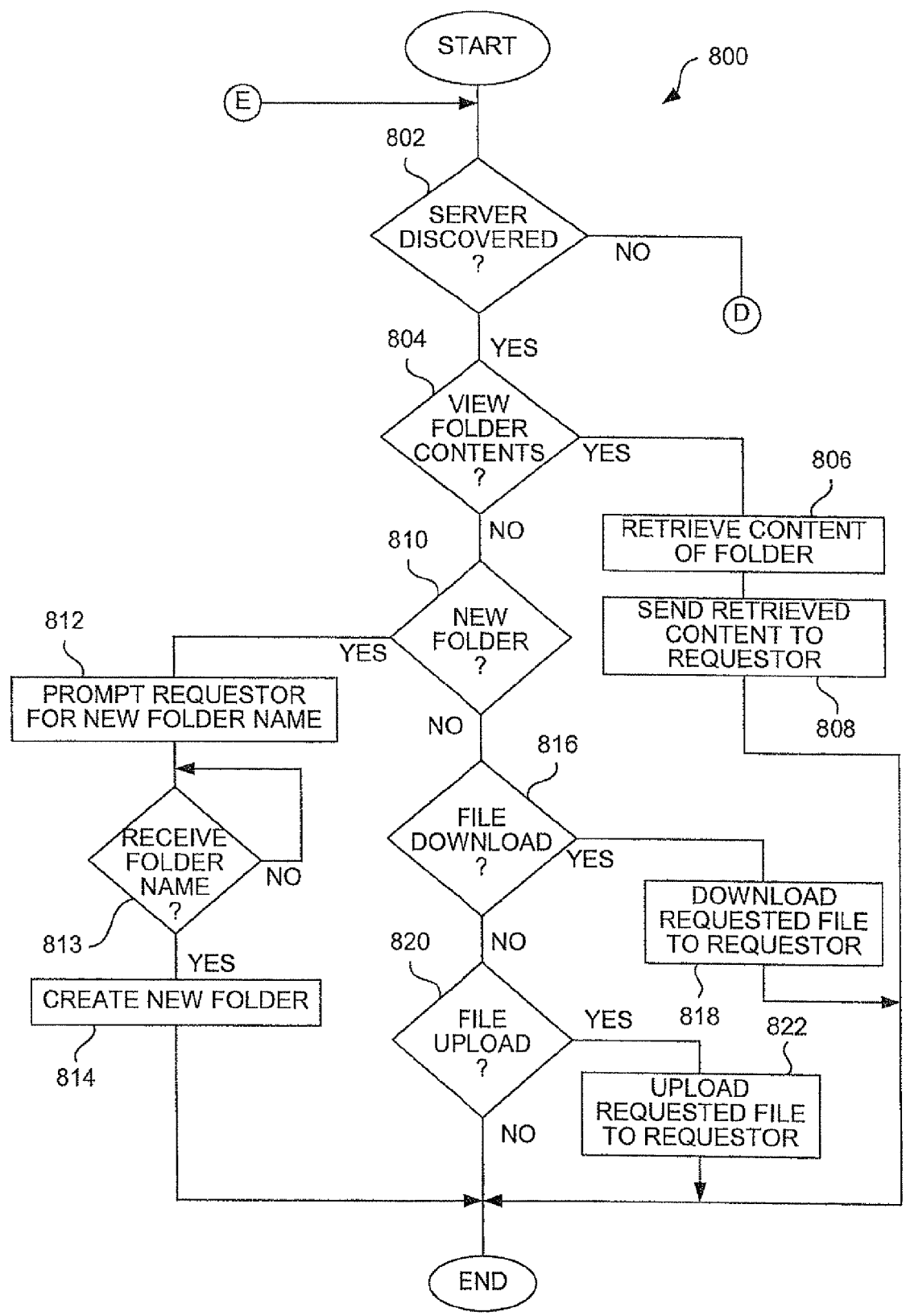
FIGS. 8A and 8B are flow diagrams of file access request processing according to one embodiment of the invention.
Figure 8B:
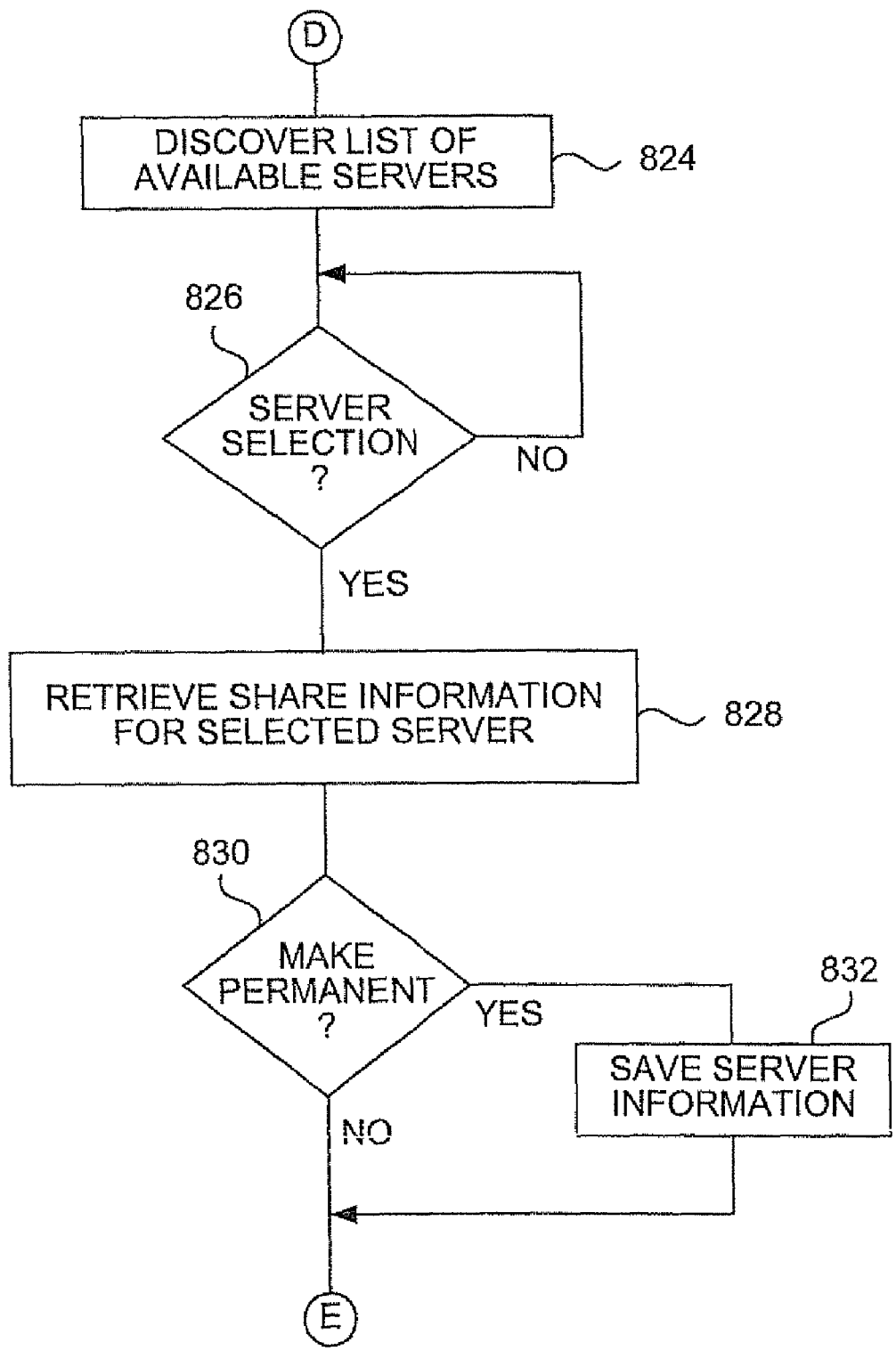

FIGS. 8A and 8B are flow diagrams of file access request processing 800 according to one embodiment of the invention. The file access request processing 800 is, for example, the processing performed when a web browsing operation has been requested by a requestor. In other words, the file access request processing 800 can, for example, be the processing performed by one embodiment of the block 622 of FIG. 6.

The file access request processing 800 begins with a decision 802 that determines whether a server has been discovered. When the decision 802 determines that a server has already been discovered, then a decision 804 determines whether the file access request seeks to view folder contents. When the decision 804 determines that the file access request does desire to view folder contents, then the content of the folder is retrieved 806. The retrieved content is then sent 808 to the requestor.

On the other hand, when the decision 804 determines that the file access request does not seek to view folder contents, a decision 810 determines whether the file access request is requesting a new folder. When the decision 810 determines that the file access request is seeking to request a new folder, then the requestor is prompted 812 for a new folder name. A decision 813 then determines whether a folder name has been received. When the decision 813 determines that a folder name has not yet been received, the file access request processing 800 waits for the folder name. Once the decision 813 determines that the folder name has been received, the new folder is created 814.

Alternatively, when the decision 810 determines that the file access request does not desire to create a new folder, then a decision 816 determines whether the file access request desires to download a file. When the decision 816 determines that the file access request desires to download a file, then the requested file is downloaded 818 to the requestor. On the other hand, when the decision 816 determines that the file access request does not desire to download a file, then a decision 820 determines whether the file access request desires to upload a file. When the decision 820 determines that the file access request does desire to upload a file, then the requested file is uploaded 822 to the requestor. Alternatively, when the decision 820 determines that the file access request does not desire to upload a file, then additional types of file access requests could be processed, although none are shown in FIG. 8A. Accordingly, following the decision 820 when the file access request does not desire to upload a file (and no additional types of file access requests are supported), then the file access request processing 800 is complete and ends with no file access operation having been performed. Following the blocks 808, 814, 818 and 822, the file access request processing 800 is also complete and ends but does so with the requested file access having been performed.

Furthermore, when the decision 802 determines that a server has not already been discovered, then the file access request processing 800 performs the processing shown in FIG. 8B. In this case, a list of available servers is initially discovered 824. Then, a decision 826 awaits the selection of one of the available servers by the requestor. Once the decision 826 determines that a server selection has been received, then share information for the selected server is retrieved 828. In one embodiment, the share information identifies those of the folders stored on the selected server that are able to be shared with third parties, such as remote requestors. A decision 830 then determines whether the information about the server should be made permanent. When the decision 830 determines that the information about the server should be made permanent, then the server information is saved 832. By saving the server information, the server is made an "available server" such that discovery of the availability of the server is not needed with subsequent logins to the system. On the other hand, when the decision 830 determines that the information about the server should not be made permanent, then the block 832 is bypassed. In any case, following the block 830 when the server information is not to be made permanent, as well as following the block 832 when the server information is to be made permanent, the processing to discover a server is complete and thus the file access request processing 800 returns to repeat the decision 802 and subsequent operations.

Figure 9A:
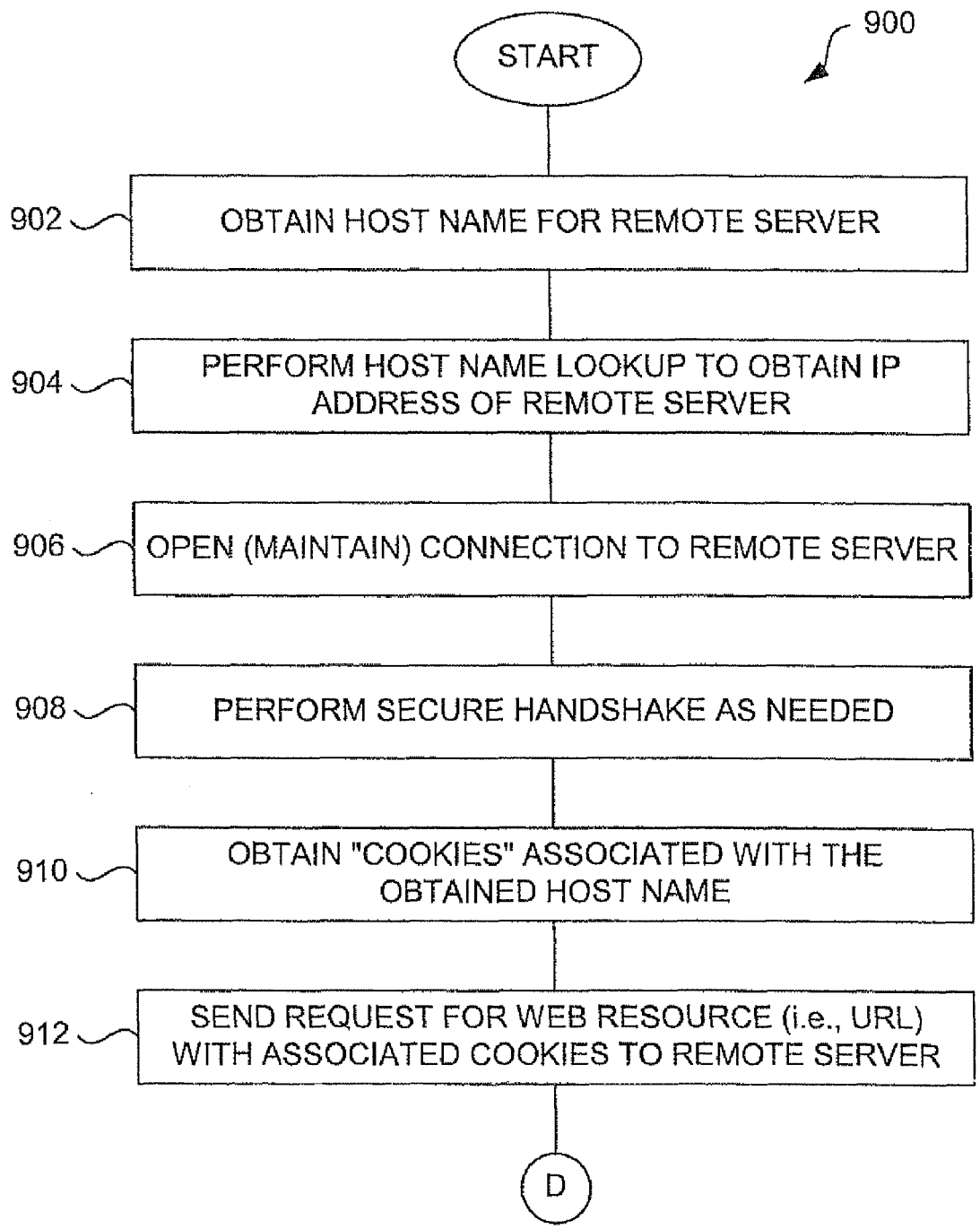
FIGS. 9A-9C are flow diagrams of web resource request processing according to one embodiment of the invention.
Figure 9B:
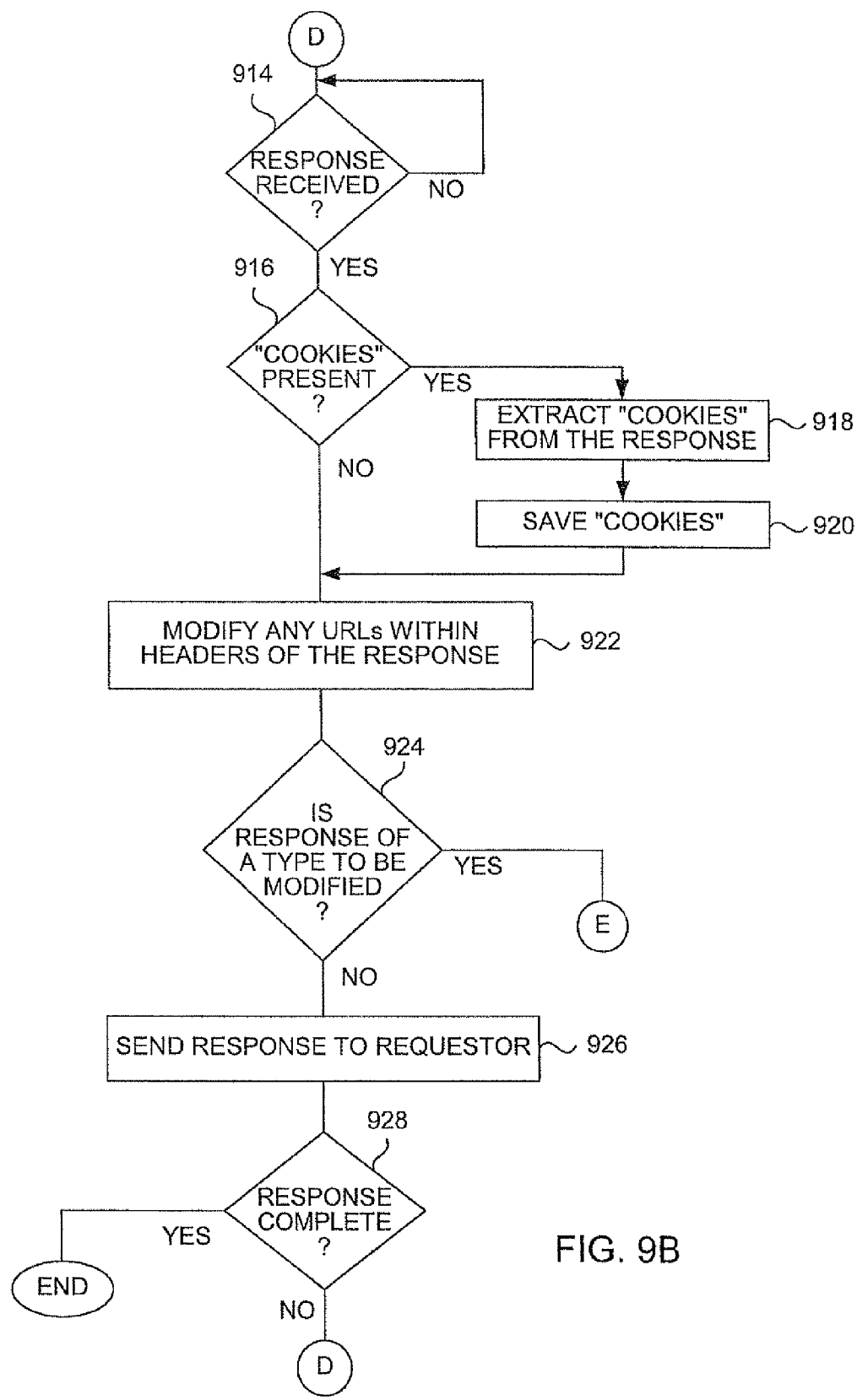
Figure 9C:
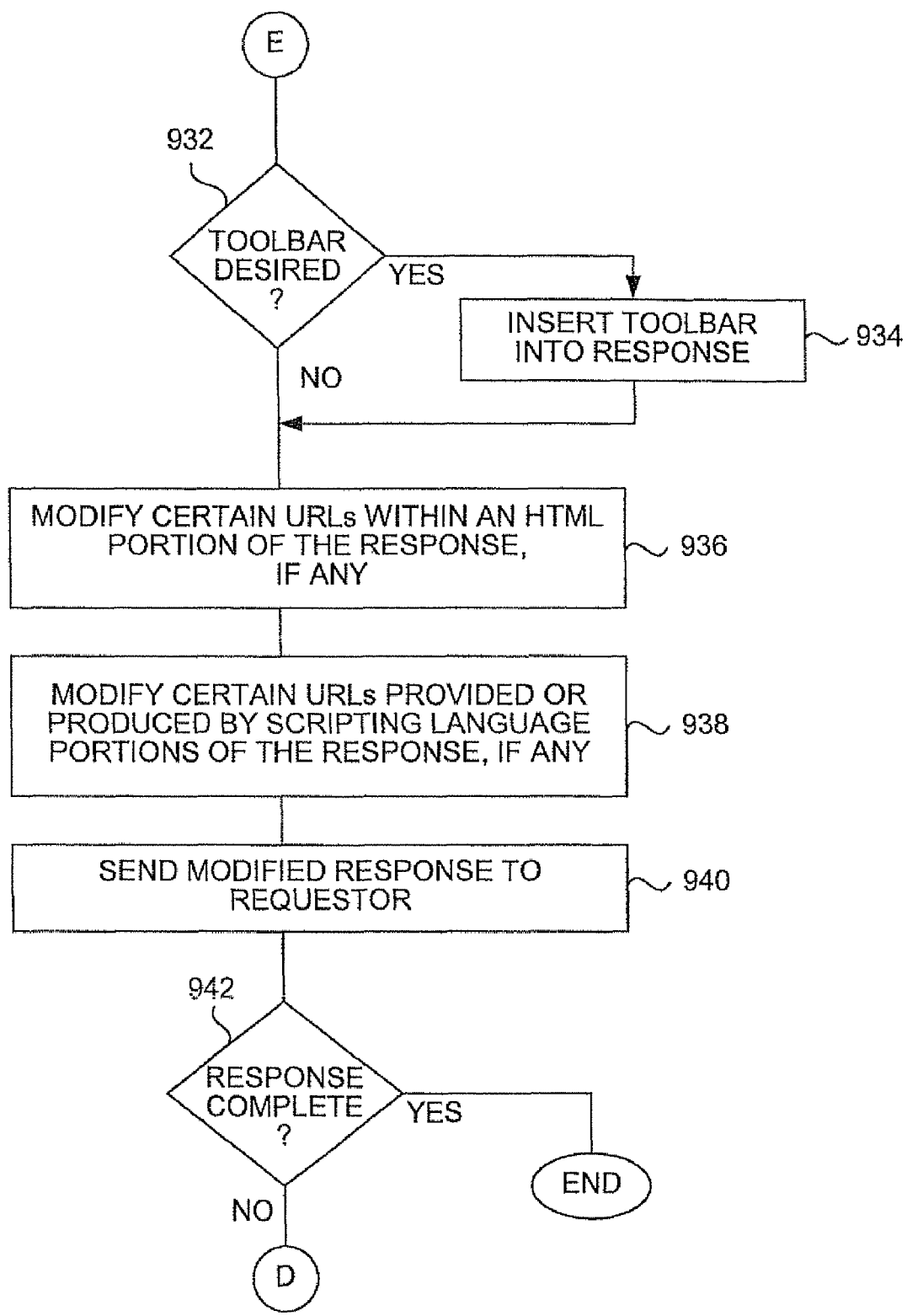

FIGS. 9A-9C are flow diagrams of web resource request processing 900 according to one embodiment of the invention. The web resource request processing 900 is, for example, performed by an intermediary server, such as the intermediary server 108 illustrated in FIG. 1A or the intermediary server 158 illustrated in FIG. 1B. The web resource request processing 900 is performed to process a web resource request.

Initially, the host name for the appropriate remote server is obtained 902. In one embodiment, the host name can be obtained from storage. Here, the storage can, for example, be the data storage device 214 illustrated in FIG. 2A. In another embodiment, the host name can be obtained from the URL associated with the web resource request. After the host name for the appropriate remote server is obtained 902, a host name lookup is performed 904 to obtain an IP address of the appropriate remote server. A connection is then opened 906 (or maintained if already opened) to the remote server. Next, a secure handshake is performed 908 between the intermediary server and the remote server as needed. Any "cookies" associated with the obtained host name are then obtained 910. Following the operation 910, the pre-processing of the web resource request at the intermediary server is complete and the request is now able to be forwarded to the remote server. At this point, the request for the web resource with associated "cookies" is sent 912 to the remote server.

A decision 914 then determines whether a response has been received. When the decision 914 determines that a response has not yet been received, the web resource request processing 900 awaits such a response. Once the decision 914 determines that a response has been received, then a decision 916 determines whether "cookies" are present in the response. When the decision 916 determines that "cookies" are present in the response, then the "cookies" are extracted 918 from the response. The extracted "cookies" are then saved 920. Typically, the "cookies" are stored in central storage provided within the intermediary server or other storage associated or coupled to the intermediary server. Following the operation 920, as well as following the decision 916 when it is determined that "cookies" are not present in the response, URLs within headers of the response are modified 922.

A decision 924 then determines whether the response is of a type that is to be modified. Here, in general, a response can be of a variety of forms such as HTML, graphics, .pdf, MPEG, or other formats. When the decision 924 determines that the response is of a type that cannot be modified (e.g., graphics), then the response can be immediately sent (or forwarded) 926 to the requestor. Then, a decision 928 determines whether the response is completed. When the decision 928 determines that the response is completed, then the web resource request processing 900 returns to repeat the decision 914 and subsequent operations so that additional web resource requests can be processed. Alternatively, when the decision 928 determines that so far only a portion of the response has been sent to the requestor, the web resource request processing 900 returns to repeat the decision 914 and subsequent operations or the like so that subsequent portions of the response can be similarly processed.

On the other hand, when the decision 924 determines that the response is of a type that can be modified (e.g., HTML), then the response is processed to modify the response before returning it to the requestor. The processing illustrated in FIG. 9C represents one embodiment of processing that can be performed to modify the response. In particular, a decision 932 determines whether a toolbar is desired. The intermediary server can be configured to always, sometimes or never insert the toolbar. The toolbar can be standardized or customizable by the intermediary server. When the decision 932 determines that a toolbar is desired, the toolbar HTML is inserted into the response. The toolbar that is produced by the toolbar HTML can provide controls or content that are added to the resulting response so as to facilitate features or functionality provided by the intermediary server.

Next, certain URLs within an HTML portion of the response can be modified 936. In one embodiment, the modifications to the certain URLs can be achieved by modifying the host name portion of URLs within certain tags of the resulting HTML. In another embodiment, the modifications to the certain URLs can be achieved by adding suffixes to the certain URLs. The suffixes thus serve to allow the URLs to carry additional information. Further, certain URLs provided or produced by scripting language portions within the resulting HTML can be modified 938. Examples of scripting languages include JavaScript and VBscript. In one embodiment, a host name portion of the certain URLs provided or produced by scripting language portions within the resulting HTML are modified 938. In another embodiment, the certain URLs provided or produced by scripting language portions are modified 938 to include suffixes which carry supplemental information. Additional details on modifying scripting language portions is provided below with reference to FIGS. 13A and 13B. Thereafter, the modified response is sent 940 to the requestor.

A decision 942 then determines whether the request has been completed. When the decision 942 determines that the request has been completed, then the web resource request processing 900 is complete and ends. On the other hand, when the decision 942 determines that the request is not yet completed, then the web resource request processing 900 returns to repeat the decision 914 and subsequent operations so that remaining portions of the response can be similarly processed upon being received. The web resource request processing 900 can thus operate to process a single response to a resource request in multiple pieces or blocks of data. In such a case, the web resource request processing 900 can process a response from a remote server as it arrives so that responsiveness to the requestor is not hindered. In this regard, the web resource request processing 900 causes the operations 914-942 to be repeated for each piece or block of data associated with a response.

Figure 10:
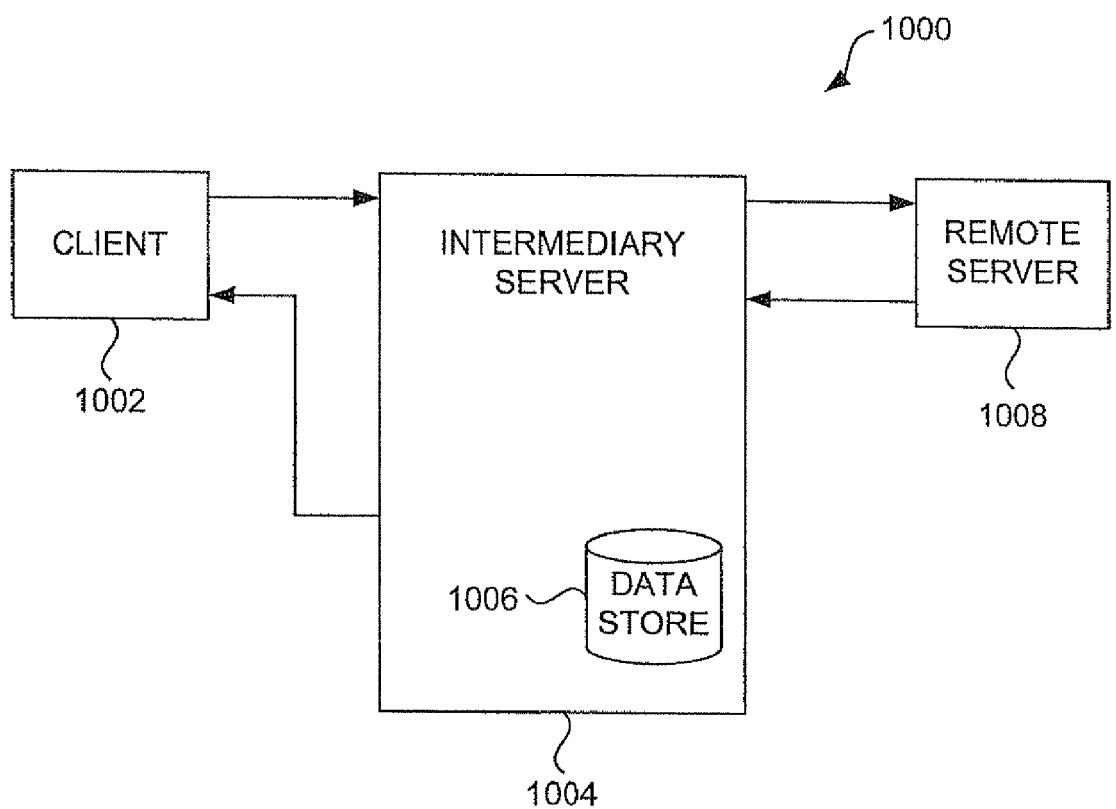
FIG. 10 illustrates a diagram of an information retrieval system according to one embodiment of the invention.

FIG. 10 illustrates a diagram of an information retrieval system 1000 according to one embodiment of the invention. The information retrieval system 1000 is generally similar to the information retrieval system 100 of FIG. 1A or the information retrieval system 150 of FIG. 1B. The operation of the information retrieval system 1000 is discussed below with reference to a representative example which illustrates its operation according to one embodiment. The information retrieval system 1000 includes a client 1002, an intermediary server 1004 with a data store 1006, and a remote server 1008. It is assumed that the request processing 300 of FIG. 3 has already been performed and that the requestor is permitted to access the requested resource in the manner sought.

The representative example pertains to a secure request which can be initiated by the user selecting a hyperlink in a displayed webpage in the content of a web browsing request. The selected hyperlink is assumed to be https://secure.danastreet.com/quote/msft:danainfo: host=www.xyz.com where "https" is the protocol which uses Secure Socket Layer (SSL), "secure.danastreet.com" is the host name with "danastreet.com" being a domain and "secure" being a subdomain, "/quote/msft" being a path to the particular resource being requested by selection of the hyperlink, "danainfo" is a keyword, and "www.xyz.com" is the host where the requested resource resides. Hence, the domain name lookup of the host name "secure.danastreet.com" is resolved to the IP address of danastreet.com, which is the intermediary server 1004 for this example. The request is then sent from the client 1002 to the intermediary server 1004. The request is, for example, as follows:

```
GET:    /quote/msft:danainfo:host=www.xyz.com   HTTP/1.0
        Host: secure.danastreet.com
        Cookie: DSID = 123xyzzbc
```

Other information can also be included within the request such as additional cookies, encoding-accepted, etc. The cookie is, in this example, a session cookie (session identifier) and is used in determining whether the client 1002 is authorized for use with the intermediary server 1004.

In the case of a secure request, the host name within the request is not able to directly identify the remote server 1008 where the request is eventually to be delivered. However, the host name for the remote server 1008 is obtained from information provided with the request. More particularly, the information (i.e., host variable) is provided as a suffix with the request. In this example, the suffix includes the information that the host name of the remote server 1008 is "www.xyz.com". Once the appropriate host name has been obtained, a domain name lookup on the host name ("www.xyz.com") is performed. Next, a connection from the intermediary server 1004 and the remote server 1008 is opened (or maintained if already opened), and secure handshaking is optionally performed. Any cookies in the data store 1006 associated with the host name and the requestor can then be obtained. Next, a request by the intermediary server 1004 is sent to the remote server 1008. The request is, for example, as follows:

```
GET:        /quote/msft    HTTP/1.0
            Host: www.xyz.com
            Cookie: xyzUserID = sam
```

Other information can also be included within the request. Note that the cookie provided with the original request pertained to the intermediary server 1004 and thus is not forwarded with the request to the remote server 1008.

The remote server 1008 receives the request and returns a response header and some or all of the content of the requested resource. An exemplary response can have the following format:

```
HTTP/1.0 200 OK
Set-cookie: xyzuserID = Samual, expires = 01-Jul-2002
Content-type: text/html
Content-length: 2000
Location: https://www.xyz.com/quote/msft
<HTML>
* *
</HTML>
```

Since the response included a "cookie" to be set, the set-cookie command is removed from the response and then saved in the data store 1006. Next, to the extent they are present, the URLs within the headers are modified to point to the intermediary server 1004. In this example, the location header includes a full path (including host name), namely, https://www.xyz.com/quote/msft, which is thus modified to https://secure.danastreet.com/quote/msft:danainfo: host=www.xyz.com,SSL. In this example, not only are the host names modified but variables are also added to the end (i.e., suffix) of the URL. The variable information added is an indication of the host server having the requested resource and an SSL indicator. With this example, the relative URLs need to be modified to include the variable information ("danainfo:host=www.xyz.com") at the end of the relative URLs. The host names for the relative URLs are properly provided by the browser application operating on the client 1002 which causes the current host name ("secure.danastreet.com") to be used for such paths. If desired, a toolbar can be inserted into the HTML data to facilitate operations or functions supported by the intermediary server 1004. Still further, the URLs within certain tags within the resulting HTML or those produced by scripting languages are modified to point to the intermediary server 1004.

For example, if the HTML data included the following hyperlink:

<a ref=https://www.xyz.com/quote/msft> then the hyperlink would be modified to the following:

```
<a ref=https://secure.danastreet.com
/quote/msft:danainfo:host=www.xyz.com,SSL>.
```

Also, if the HTML data included the following relative hyperlink:

<a ref=a.html> then the hyperlink would be modified to the following:

<a ref=a.html:danainfo:host=www.xyz.com,SSL>.

It should be noted that the variable information provided at the end (i.e., suffix) of the URLs need not be at the actual end. Here, suffix is used to generally indicate to the right of the domain name. Indeed, the variable information can be placed in a variety of different locations in a URL (even to the left of the domain name). For example, if the original hyperlink itself has variables such as following the characters "?" or "#", then the variable information ("danainfo:host=www.xyz.com") can, in one example, be placed before the character "?" or "#" indicating the original variables. For example, if the HTML data included the following hyperlink:

<a ref=https://www.xyz.com/quote/msft?color=red> then the hyperlink would be modified to the following:

```
<a ref=https://secure.danastreet.com
/quote/msft:danainfo:host=www.xyz.com?color=red>.
```

Also, if the HTML data included the following relative hyperlink:

<a ref=a.html?x=1234> then the hyperlink would be modified to the following:

<a ref=a.html:danainfo:host=www.xyz.com?x=1234>.

As still another example, if the HTML data included the following relative hyperlink:

<a ref=a.html, port=1234> then the hyperlink would be modified to the following:

<a ref=a.html:danainfo:host=www.xyz.com, port=1234>.

Figure 11:
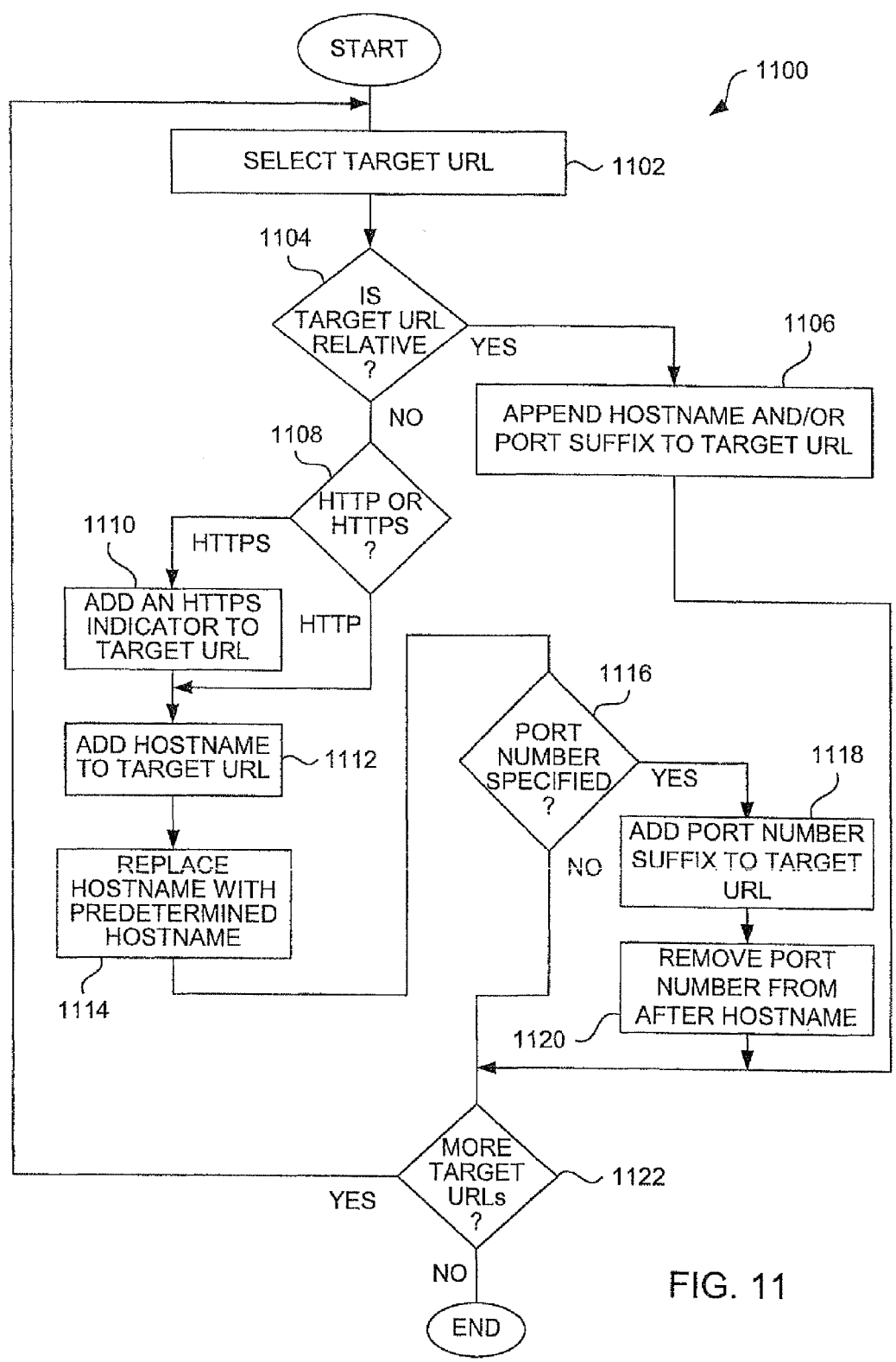
FIG. 11 is a flow diagram of URL modification processing according to one embodiment of the invention.

FIG. 11 is a flow diagram of URL modification processing 1100 according to one embodiment of the invention. The URL modification processing 1100 is, for example, processing performed by operation 936 of FIG. 9C. The URL modification processing 1100 can, for example, be performed by the content transformer 216 illustrated in FIG. 2A or the content transformer 278 illustrated in FIG. 2B.

The URL modification processing 1100 begins by selecting 1102 a target URL within an HTML portion of the response (e.g., webpage). Typically, one or more target URLs are previously identified by scanning the HTML data. Then, a decision 1104 determines whether the target URL is a relative URL. A relative URL inherits the characteristics of its source URL. The source URL is the URL associated with the webpage (including the resulting HTML) that includes the target URL. When the decision 1104 determines that the target URL is a relative URL, then the hostname and/or port suffix from the source URL are appended 1106 to the target URL.

Alternatively, when the decision 1104 determines that the target URL is not a relative URL, then a decision 1108 determines whether the target URL is associated with a secure request (e.g., HTTPS). When the decision 1108 determines that the request for the target URL is a secure request, then a secure indicator (e.g., HTTPS) is added 1110 to the target URL. On the other hand, if the decision 1108 determines that the target URL is not associated with a secure request, the operation 1110 is bypassed.

Following the operation 1110 as well as directly following the decision 1108 when the target URL is not associated with a secure request, then the host name provided with the target URL is added 1112 elsewhere to the target URL. For example, the host name provided with the target URL can be appended to the target URL. Then, the original host name provided with the target URL is replaced 1114 with a predetermined host name. In other words, the host name originally provided for the target URL is effectively rewritten such that the original host name is replaced with the predetermined host name, but the original host name remains part of the target URL. For example, the predetermined host name is the host name for the appropriate intermediary server.

Next, a decision 1116 determines whether a port number is specified in the target URL. When the decision 1116 determines that a port number is specified in the target URL, then a port number suffix is added 1118 to the target URL. The port number originally specified in the target URL following the host name is removed 1120.

Following the operation 1120, the URL modification processing 1100 performs a decision 1122. Additionally, when the decision 1116 determines that a port number is not specified in the target URL, no port number processing is needed so the decision 1122 is then performed. The decision 1122 determines whether more target URLs are to be processed. As previously noted, these target URLs have been previously identified by scanning the resulting HTML data. When the decision 1122 determines that there are more target URLs, then the URL modification processing 1100 returns to repeat the operation 1102 and subsequent operations so that additional target URLs can be processed. Alternatively, when the decision 1122 determines that there are no more target URLs, then the URL modification processing 1100 is complete and ends.

Figure 12:
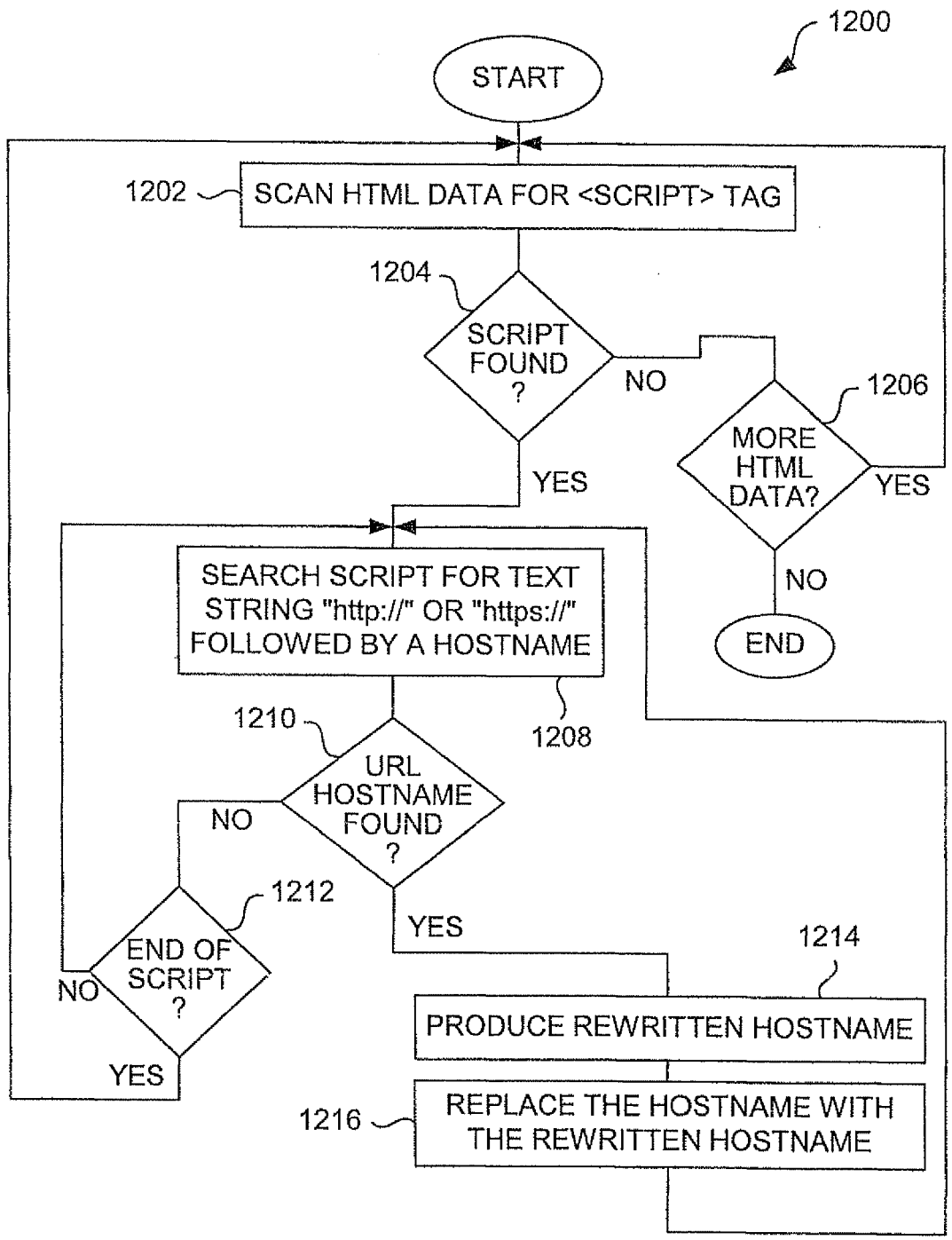
FIG. 12 is a flow diagram of script modification processing according to one embodiment of the invention.

FIG. 12 is a flow diagram of a script modification processing 1200 according to one embodiment of the invention. The script modification processing 1200 is, for example, performed by operation 938 illustrated in FIG. 9C. In general, the script modification processing 1200 operates to modify script portions within the resulting HTML.

The script modification processing 1200 initially scans 1202 the HTML data (e.g., of the resulting HTML) for a <script> tag. A decision 1204 then determines whether a script has been found. When the decision 1204 determines that a script has not been found, then a decision 1206 determines whether there is more HTML data to be scanned. When the decision 1206 determines that there is more HTML data to be scanned, then the script modification processing 1200 returns to repeat the operation 1202 and subsequent operations. Alternatively, when the decision 1206 determines that there is no more HTML data to be scanned, the script modification processing 1200 is complete and ends.

On the other hand, when the decision 1204 determines that a script has been found, then the script is searched 1208 to locate text strings "http://" or "https://" followed by a host name. A decision 1210 then determines whether a URL host name has been found by the searching 1208 of the script. When the decision 1210 determines that a URL host name has not been found, then a decision 1212 determines whether the end of the script has been reached. When the decision 1212 determines that the end of the script has not yet been reached, then the script modification processing 1200 returns to repeat the operation 1208 and subsequent operations. Alternatively, when the decision 1212 determines that the end of the script has been reached, then the script modification processing 1200 returns to repeat the operation 1202 and subsequent operations so that additional scripts can be found and processed.

On the other hand, when the decision 1210 determines that a URL host name has been found, then a rewritten host name is produced 1214. The host name provided within the script is then replaced 1216 with the rewritten host name. Following the operation 1216, the script modification processing 1200 returns to repeat the operation 1208 and subsequent operations so that additional host names within the script can be similarly processed.

Figure 13A:
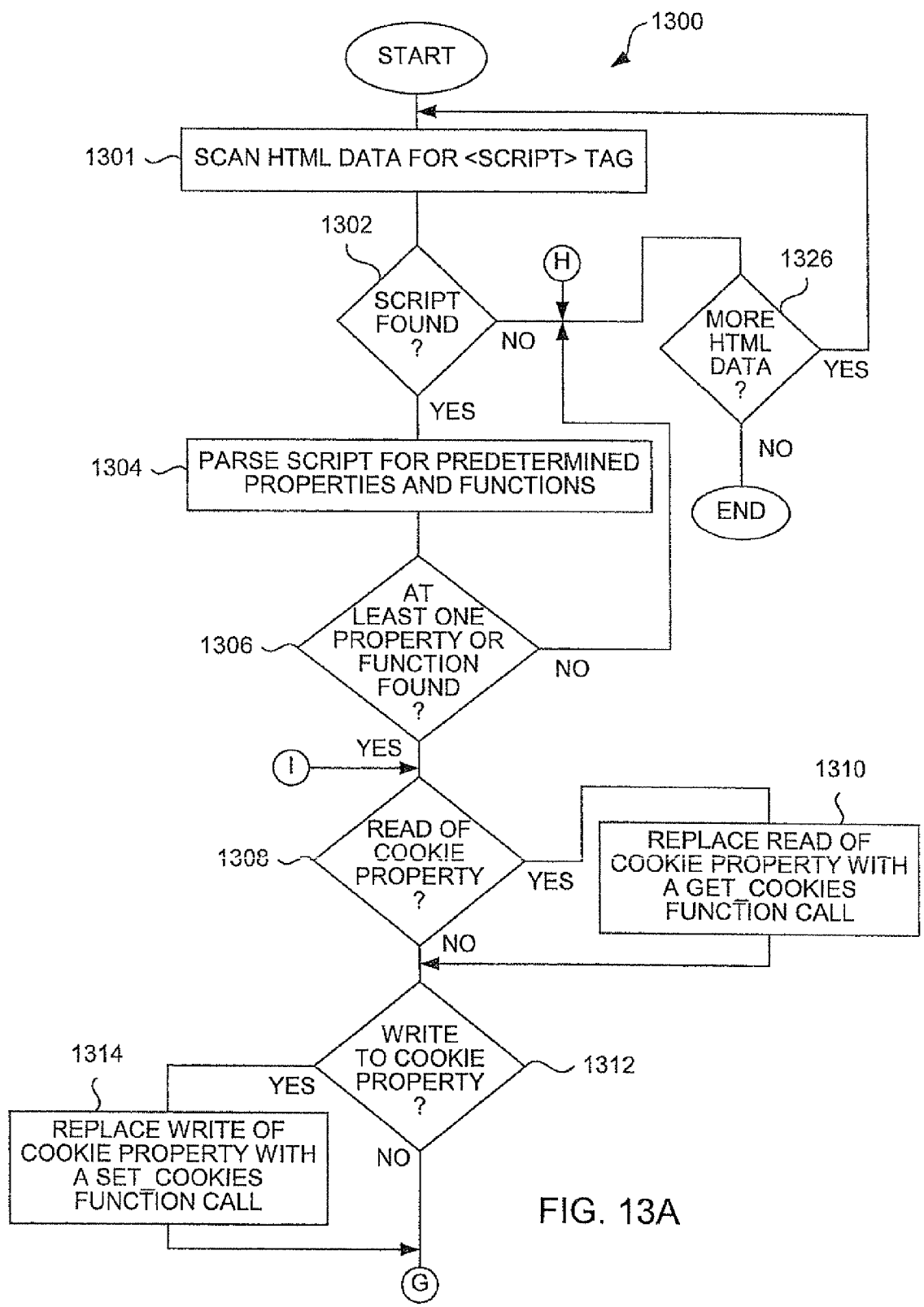
FIGS. 13A and 13B are flow diagrams of script modification processing according to another embodiment of the invention.
Figure 13B:
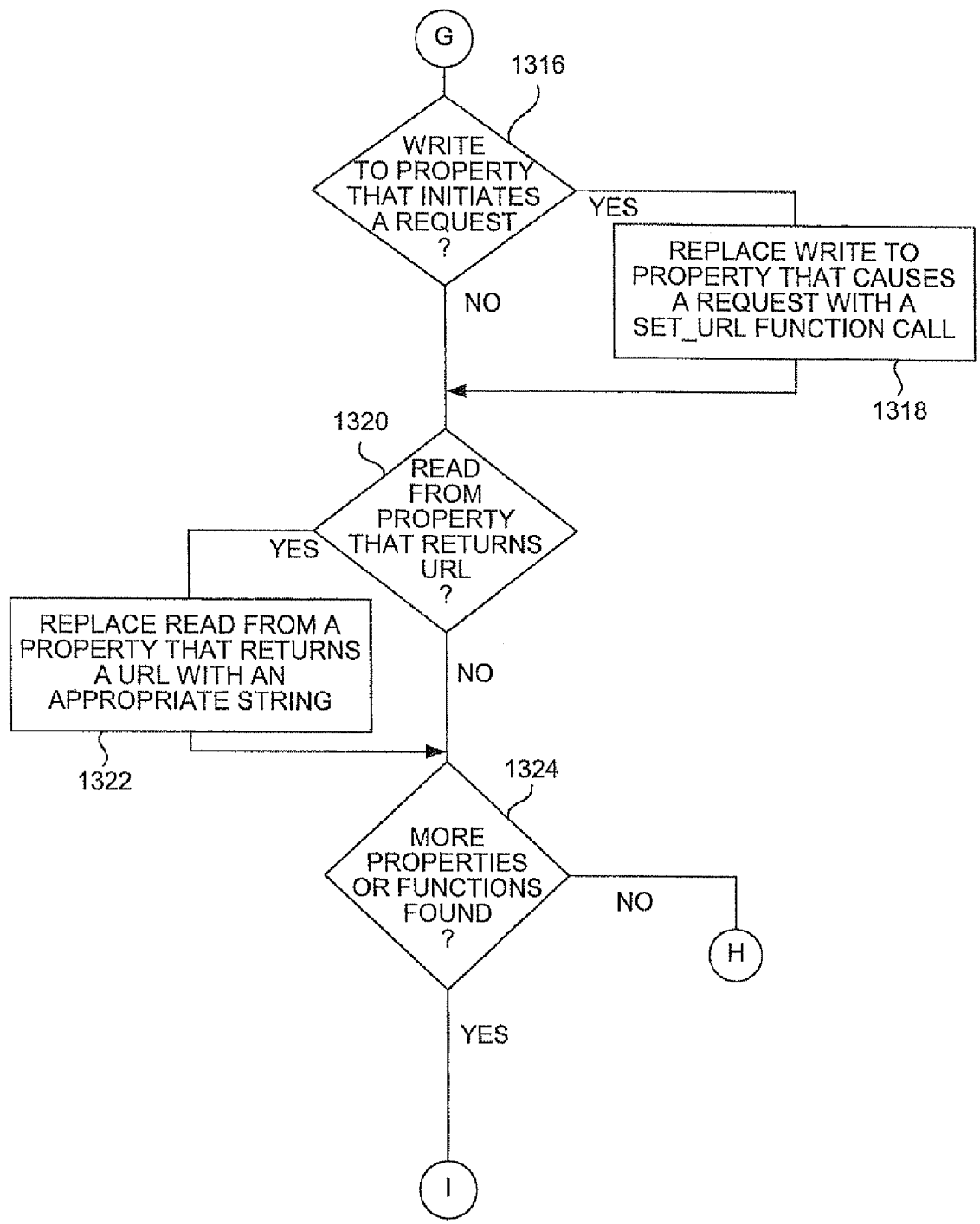

FIGS. 13A and 13B are flow diagrams of a script modification processing 1300 according to another embodiment of the invention. The script modification processing 1300 is, for example, performed by operation 938 illustrated in FIG. 9C. In general, the script modification processing 1300 operates to modify script portions within the resulting HTML.

The script modification processing 1300 initially scans 1301 the HTML data (e.g., of the resulting HTML) for a <script> tag. A decision 1302 then determines whether a script has been found. When the decision 1302 determines that a script has been found, then the script is parsed 1304 to determine or locate predetermined properties and functions associated with the script. A decision 1306 then determines whether at least one property or function has been found in the script. When the decision 1306 determines that at least one property or function has been found, then the script modification processing 1300 continues such that the script is modified with respect to the properties or functions found within the script so that the script operates as intended even though the intermediary server is interposed between client devices and remote servers.

In particular, for each property or function found within the script, the processing is as follows. A decision 1308 determines whether a selected property or function found within the script pertains to a read of a cookie property. When the decision 1308 determines that the identified property or function does pertain to a read of a cookie property, then the read of the cookie property is replaced 1310 with a get_cookies function call. Alternatively, when the decision 1308 determines that the identified property or function is not a read of a cookie property, as well as following the operation 1310, a decision 1312 determines whether the identified property or function pertains to a write to a cookie property. When the decision 1312 determines that the identified property or function does pertain to a write to a cookie property, the write to the cookie property is replaced 1314 with a set_cookies functions call.

On the other hand, when the decision 1312 determines that the identified property or function is not associated with a write to a cookie property, as well as following the operation 1314, a decision 1316 determines whether the identified property or function pertains to a write to a property that initiates a request. When the decision 1316 determines that the identified property or function does pertain to a write to a property that initiates a request, then the write to the property that initiates (causes) a request is replaced 1318 with a set_URL function call. Alternatively, when the decision 1316 determines that the identified property or function does not pertain to a write to a property that initiates a request, as well as following the operation 1318, a decision 1320 determines whether the identified property or function pertains to a read from a property that returns a URL. When the decision 1320 determines that the identified property or function does pertain to a read from a property that returns a URL, then the read from a property that returns a URL is replaced 1322 with an appropriate string.

Furthermore, following the decision 1320 when the identified property or function does not pertain to a read from a property that returns a URL, as well as following the operation 1322, a decision 1324 determines whether more properties or functions were found in the script that still need to be processed. When additional properties or functions have been found and need processing, the script modification processing 1300 returns to repeat the decision 1308 and subsequent operations so that the additional properties or functions can be similarly processed. On the other hand, when the decision 1324 determines that all the properties or functions that have been found within the script have been processed, then the script modification processing 1300 performs a decision 1326. The decision 1326 is also performed when the decision 1302 determines that a script has not been found. The decision 1326 determines whether there is more HTML data to be scanned. When the decision 1326 determines that there is more HTML data to be scanned, then the script modification processing 1300 returns to repeat the operation 1301 and subsequent operations. Alternatively, when the decision 1326 determines that there is no more HTML data to be scanned, the script modification processing 1300 is complete and ends.

Representative examples of a get_cookies function, a set_cookies function, a set_URL function, and string substitution are provided below. These examples are provided to assist understanding and thus should not be deemed restrictions on any aspect of the invention. The following examples use JavaScript as the scripting language.

A first example with respect to the get_cookies function and operation 1310 is as follows. In this example, the script includes a script instruction
    var c=document.cookie;
which assigns the cookies associated with the document (page) to the variable c. This script instruction would be replaced with
    var c=get_cookies ("othercookie=abc");
which assigns the cookies present on the intermediary server for the particular domain of the document (page) and the particular user (e.g., "othercookie=abc"). In addition, the get_cookies function takes the cookies from the intermediary server as its argument and adds to it other cookies that are set by the script.

A second example with respect to the set_cookies function and operation 1314 is as follows. In this example, the script includes a script instruction
    document.cookie="selection=ijk; expires= . . . ";
which stores the cookies associated with the document (page) in the browser. This script instruction (statement) is replaced with
    document.cookie=set_cookie ("<domain>", "selection=ijk; expires= . . . ";);
which stores the cookies associated with the document (page) in the browser and also to the intermediary server. The set_cookie function includes two arguments. The first argument identifies the domain of the page having the script. The second argument is the value that was originally being assigned to the document.cookie property. The set_cookie function combines these two arguments and sets a cookie called servercookieX with no expiration, where X represents a distinguishing numeric value. The browser will cause this cookie to be sent to the intermediary server. The intermediary server can then incorporate the cookie into the cookie storage for the user. The cookie can also be used to expire an existing cookie in storage for the user. Once the cookie is stored at the intermediary server, the next page that the intermediary server returns will cause the servercookieX to expire because it is no longer needed. Any calls to the set_cookie function will also append any cookie values provided within the servercookieX.

To further illustrate, consider the following example where a page from www.xyz.com has the following script:

```
document.cookie = "a=b";
var x = document.cookie;.
```

Assume also the www.xyz.com server has previously returned a cookie to the intermediary server that has a name "id1" with a value "sam". The code above will be transformed into:

```
document.cookie = set_cookie ("www.xyz.com", "a=b");
var x = get_cookie ("id1=sam");.
```

The first line will cause a cookie "servercookie0" to be set that has the value "a=b~domain=www.xyz.com", hence the whole cookie will be:
    servercookie0=a=b~domain=www.xyz.com.
Note that the domain part of the servercookie0 is used purely by the intermediary server so that it knows which domain is setting the cookie. The second line calls the get_cookies function which takes its first argument (filled in by the intermediary server while the script was rewritten) and examines all servercookie0'cookies at the browser. It concatenates the first argument together with any servercookieX cookies, and returns the result:

id1=sam; a=b.

Note, this is the same result that would have been returned from the original page had it not been rewritten.

A third example with respect to the set_URL function and operation 1318 is as follows. The set_URL function operates to modify properties that cause a request. In this example, the script includes a script instruction document.location="http://www.xyz.com/foo.html";

which directs the browser to a new page. Such a script instruction can be replaced with

```
document.location = set_URL(
    "","http://www.xyz.com/foo.html");.
```

The set_URL function call takes two arguments. The first argument is filled in by the intermediary server while the script is being rewritten and contains any parameters that would normally be provided in a suffix (e.g., "danainfo:") to follow a URL. It is not always needed, as will be explained below. The second argument is the URL, though it could actually be a script expression (e.g., function call) that assembles or returns a URL.

The set_URL function examines the URL being set and rewrites it to be of a form that will direct the browser to the intermediary server. As noted above, the modification to URLs can be achieved with various techniques.

If the page is using the host name modification technique, then relative URLs do not need to be modified since the host name encodes the necessary information. If the URL is a full URL, then the set_URL function has all of the information it needs to convert the URL. For example, a suffix (e.g., ":danaInfo:host=xxx") can be appended to the URL. Thus, if the page that the script appears on is using the host name modification technique, the first argument is not needed by the set_URL function.

Alternatively, if the page upon which the script is present is using the URL suffix technique, then a relative URL that is passed to the set_URL function needs to have the same suffix applied to it. In this case, the intermediary server will insert, as the first argument to the set_URL function, any arguments that need to be passed in the suffix. For example, if the URL of the page is:

https://secure.danastreet.com/quote/msft:danaInfo:
host=www.xyz.com and a script instruction on the page includes:

document.location="/quote/ibm";

then the rewritten script instruction would look like:

document.location=set_URL("Host=www.xyz.com",
"/quote/ibm");

and the returned result from the set_URL function would be:

/quote/ibm:danaInfo:host=www.xyz.com which would result in a request from the browser for:

https://secure.danastreet.com/quote/ibm:danaInfo:
host=www.xyz.com.

Alternatively, if the script instruction were instead:

document.location="https://www.abc.com/info/msft";

then the rewritten script instruction would look like:

```
document.location = set_URL("Host=www.xyz.com",
"https://www.abc.com/info/msft");
and the returned result from the set_URL function would be:
``` https://secure.danastreet.com/info/msft:danaInfo:
host=www.abc.com.

Note that, in this case, the first argument to the set_URL function is not needed because the second argument is a full URL and contains all of the information necessary to construct the final URL.

It should be noted that there are many functions or properties that, when written to, can cause the browser to fetch a URL. Some examples include:

```
window.open('url', ...)
form.action = 'url';
document.location = 'url';
document.location.replace('url');
image.src = 'url';.
```

A fourth example with respect to the string substitution and operation 1322 is as follows. The string substitution operates to modify properties that return a URL. Here, script instructions that read from a property that return a URL are replaced with a constant string. In this example, if the script includes var url=document.location;

such would be replaced by:

var url="http://www.yahoo.com/foo.html".

This operation serves to ensure that any script examining its environment would not be confused by the fact that the actual URL of the page is different from what it expects. Note that there is more than one property that may need to be modified. Some examples of properties that can be so modified include:

```
document.location    (returns full URL)
document.domain      (returns just the hostname part of URL).
```

Figure 14:
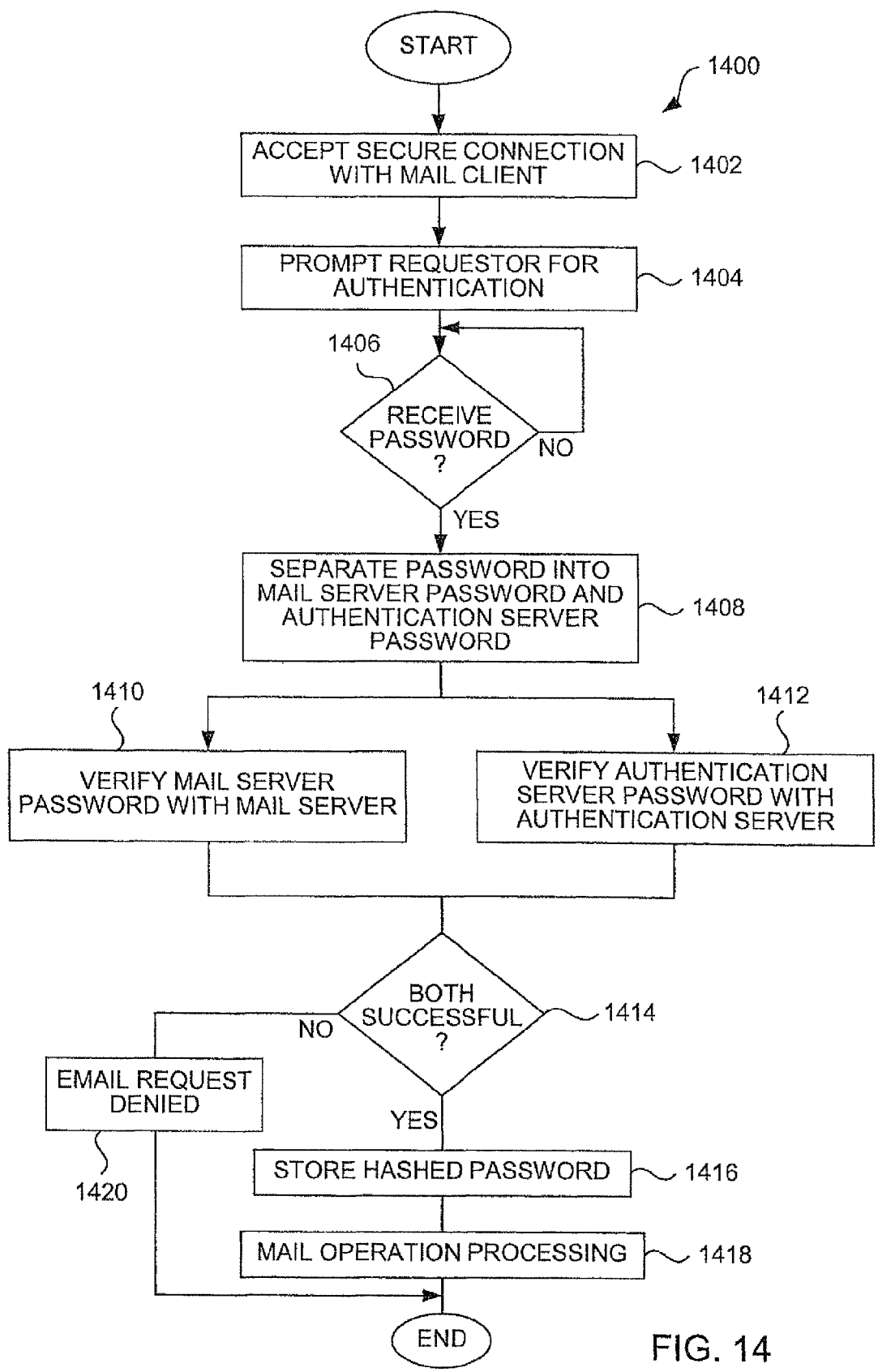
FIG. 14 is a flow diagram of email request processing according to one embodiment of the invention.

FIG. 14 is a flow diagram of email request processing 1400 according to one embodiment of the invention. The email request processing 1400 is, for example, suitable for use as the email request processing performed at block 628 of FIG. 6.

The email request processing 1400 initially accepts 1402 a secure connection with a mail client. Here, the secure connection between the mail client and the intermediary server that is being accepted 1402 can, for example, be made secure through use of a Secure Socket Layer (SSL). Next, the requestor is prompted 1404 for authentication. Typically, the requestor is prompted 1404 to enter at least a password that can be used to authenticate the requestor. A decision 1406 then determines whether a password has been received. Typically, but not necessarily, the password being received is encoded in some manner. For example, base-64 encoding is often utilized. When the decision 1406 determines that a password has been received, then the password can be separated 1408 into a mail server password and an authentication server password. As an example, the received password can include both the mail server password and the authentication server password separated by a password separator.

Next, the email server attempts to verify 1410 the mail server password. At about the same time, the authentication server password can attempt to be verified 1412 with the authentication server. Next, a decision 1414 determines whether both of the verifications of blocks 1410 and 1412 have been successful. When the decision 1414 determines that both of the verifications have been successful, then a hashed version of the password is stored 1416. Then, the mail operation processing 1418 associated with the email request is performed. On the other hand, when the decision 1414 determines that both of the verifications of blocks 1410 and 1412 are not successful, then the email request is denied 1420. Following the operations 1418 and 1420, the email request processing 1400 is complete and ends.

Figure 15:
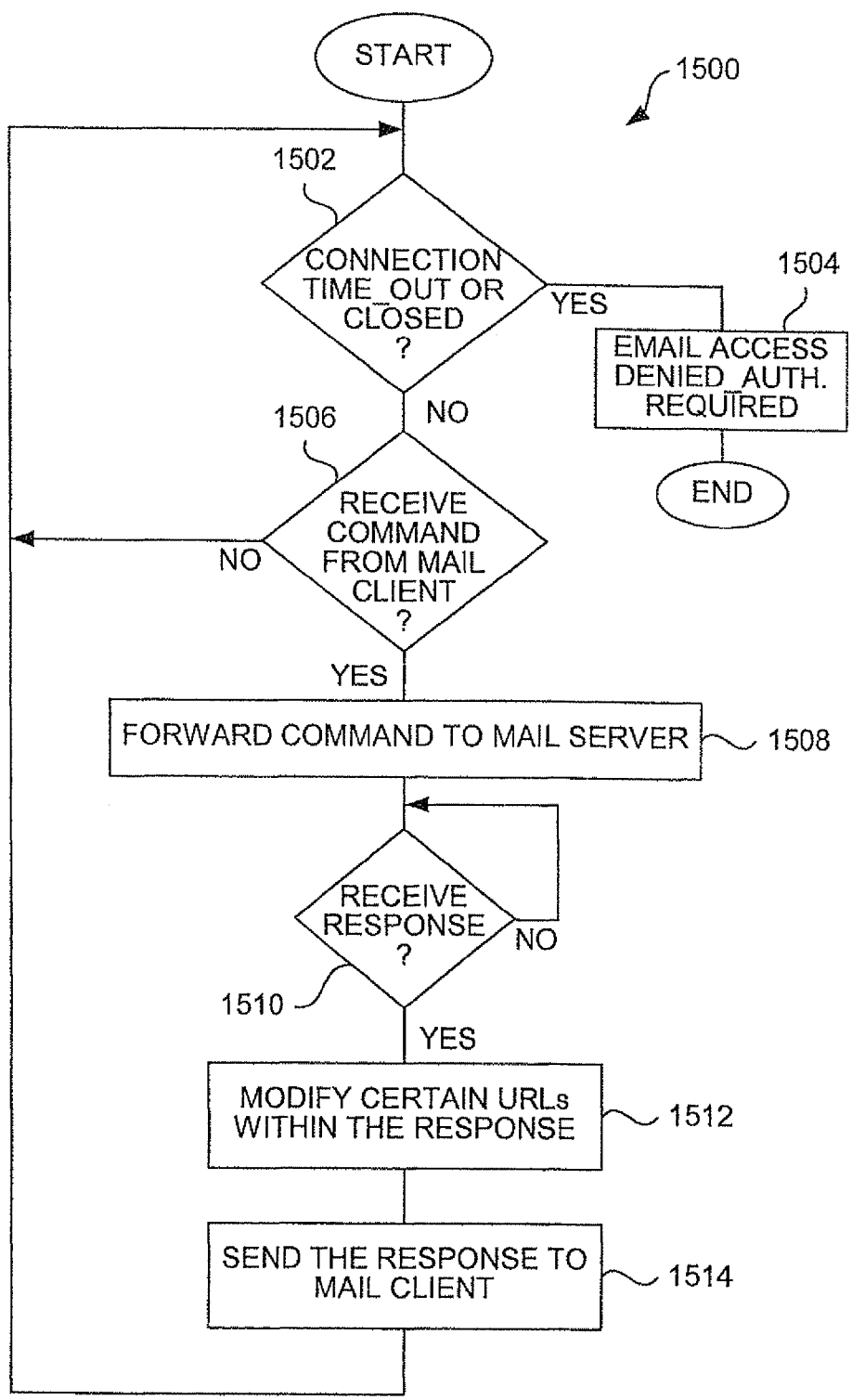
FIG. 15 is a flow diagram of mail operation processing according to one embodiment of the invention.

FIG. 15 is a flow diagram of mail operation processing 1500 according to one embodiment of the invention. The mail operation processing 1500 is, for example, one example of processing that can be performed by the block 1418 illustrated in FIG. 14.

The mail operation processing 1500 begins with a decision 1502 that determines whether the connection has timed-out or closed. Here, the connection refers to the secure connection between the mail client and the intermediary server. When the decision 1502 determines that a secure connection has timed-out or closed, then email access to the mail server is denied 1504. Hence, following the block 1504, the mail operation processing is complete and ends when the secure connection has timed-out or closed. However, the processing could continue to return a login page to the requestor to force the requestor to login and be authenticated in order to gain access to the mail server.

On the other hand, when the decision 1502 determines that an existing connection has not timed-out or closed, then a decision 1506 determines whether a command from a mail client has been received. When the decision 1506 determines that a command from a mail client has not been received, then the mail operation processing 1500 returns to repeat the decision 1502 and subsequent operations until a command from the mail client has been received or until the connection has timed-out or otherwise closed.

Once the decision 1506 determines that a command from a mail client has been received, then the command is forwarded 1508 to the mail server. Next, a decision 1510 determines whether a response has been received from the mail server. When the decision 1510 determines that a response has not yet been received from the mail server, then the mail operation processing 1500 awaits such a response. Once the decision 1510 determines that a response has been received, then certain Universal Resource Locators (URLs) within the response are modified 1512. For example, as part of the content transformation, links or URLs are able to be modified to redirect the links through the intermediary server. Next, the response is sent 1514 to the mail client. Here, the response is sent to the mail client using the connection that exists between the mail client and the intermediary server. Following the block 1514, the mail operation processing 1500 returns to repeat the decision 1502 and subsequent operations so that additional commands can be processed with respect to the mail server.

Figure 16:
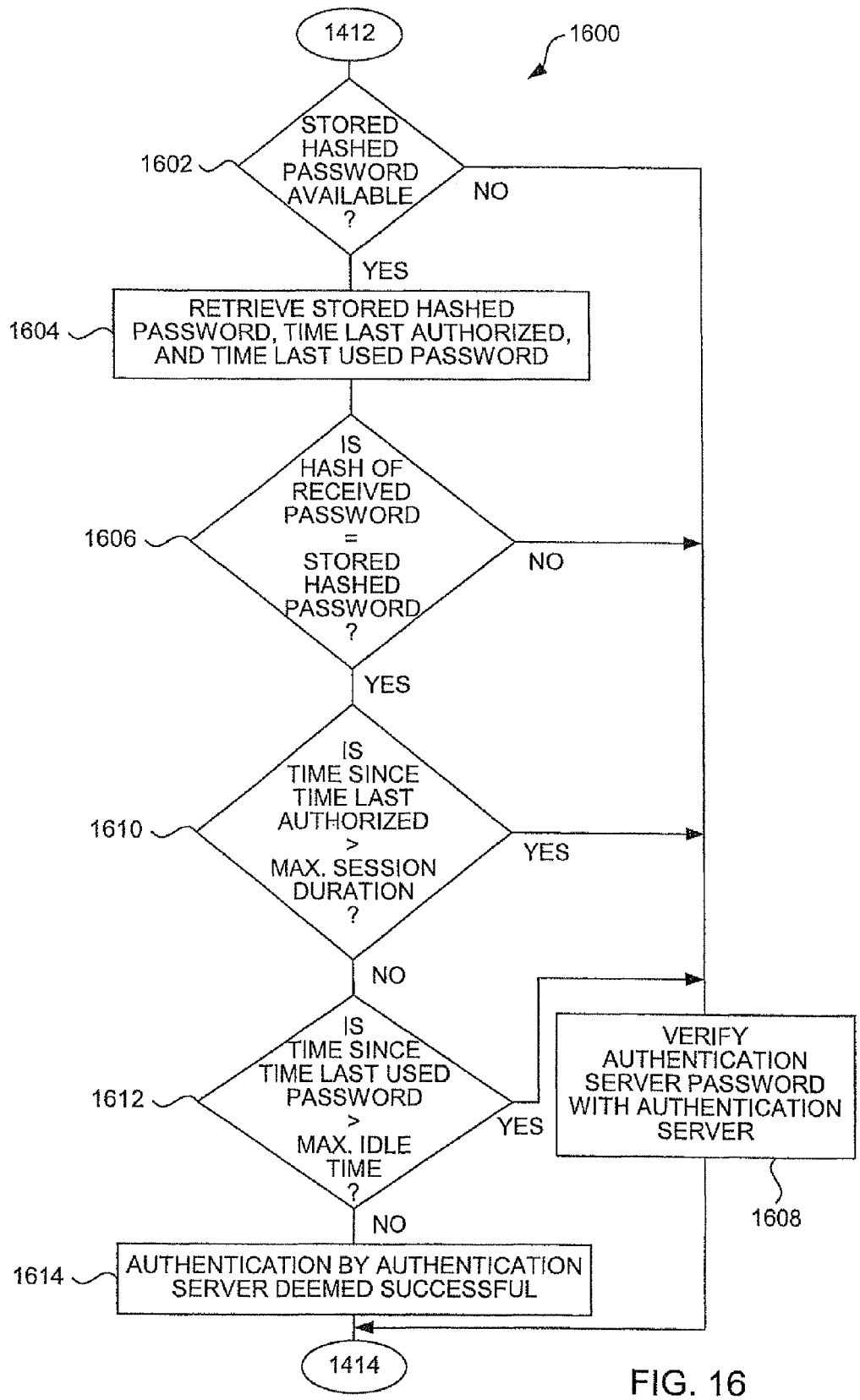
FIG. 16 is a flow diagram of authentication processing according to one embodiment of the invention.

FIG. 16 is a flow diagram of authentication processing 1600 according to one embodiment of the invention. The authentication processing 1600 represents one embodiment of the block 1412 illustrated in FIG. 14. In this embodiment, the intermediary server is able to bypass or avoid actual verification of a password with the authentication server when certain conditions are met. By doing so, the authentication can, in many cases, be performed very quickly and without the need to burden or annoy requestors.

The authentication processing 1600 begins with a decision 1602 that determines whether a stored hashed password is available. When a hashed password is previously stored (operation 1416 of FIG. 14), the hashed password can later be retrieved and used in this regard. Hence, when the decision 1602 determines that the stored hashed password is available, then the stored hashed password, a time last authorized and a time last used password are retrieved 1604. Typically, these values are stored in the data store associated with the intermediary server and are stored values that are particular to the requestor.

Next, a decision 1606 determines whether a hash of the received password equals the stored hashed password. When the decision 1606 determines that the hash of the received password is equal to the stored hashed password, then the requestor is, in effect, authenticated, because earlier in the session they entered the proper password that was then authenticated. Further, a decision 1610 determines whether the time since the time last authorized is greater than a maximum session duration. Here, the variable indicating the duration of time that has expired since the time last authorized is compared to the maximum session duration. Typically, the maximum session duration is set by the requestor or by the system administrator of the intermediary server.

In any case, when the decision 1610 determines that the time since the time last authorized does not exceed the maximum session duration, then a decision 1612 determines whether the time since the time last used password exceeds a maximum idle time. Here, the variable indicating the duration of time that has expired since the time last used password is compared to the maximum idle time. When the decision 1612 determines that the time since last used the password does not exceed the maximum idle time, then authentication 1614 by the authentication server is deemed successful without having to interact with the authentication server. Hence the authentication with respect to the authorization server is able to be bypassed when the hash of the received password equals the stored hash password, provided the time since last authorized does not exceed the maximum session duration, and further provided the time since last used the password does not exceed the maximum idle time.

On the other hand, the password is verified 1608 with the authentication server when the special conditions do not exist. For example, when the decision 1602 determines that the stored hash password is not available, then the verification 1608 with the authentication server is performed. Likewise, when the decision 1606 determines that the hash of the received password is not equal to the stored hash password, then the verification 1608 of the password with the authentication server also needs to be performed. Still further, when the decision 1610 determines that the time since last authorized exceeds the maximum session duration or when the decision 1612 determines that the time since last used the password exceeds the maximum idle time, then the password needs to be verified 1608 with the authentication server.

Following the operations 1608 and 1614, the authentication processing 1600 returns to perform other processing, namely, returns to the operation 1414 illustrated in FIG. 14. Hence, when the verification 1608 is able to be bypassed because the above-mentioned special conditions exist, the authorization processing is greatly simplified and often avoids the need to perform complicated authentication processing with respect to an authentication server or to prompt a requestor for authentication information.

Figure 17A:
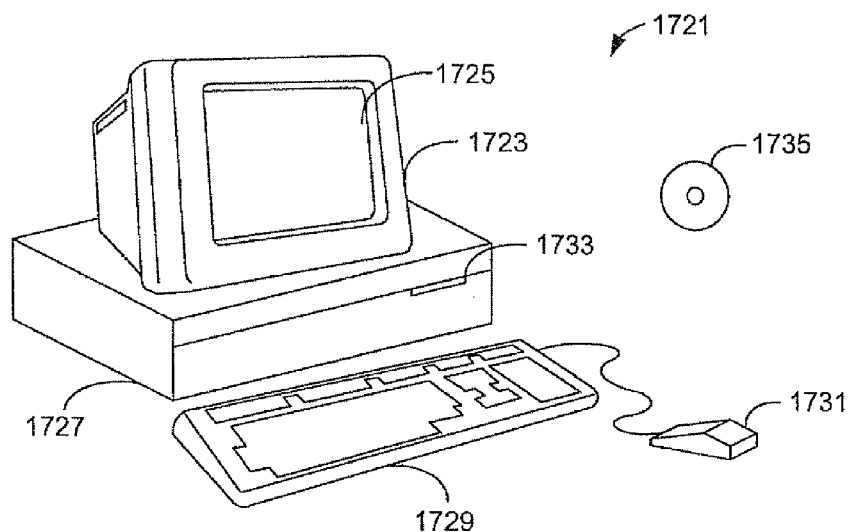
FIGS. 17A and 17B illustrate an example of a computer system that may be used in accordance with the invention.
Figure 17B:
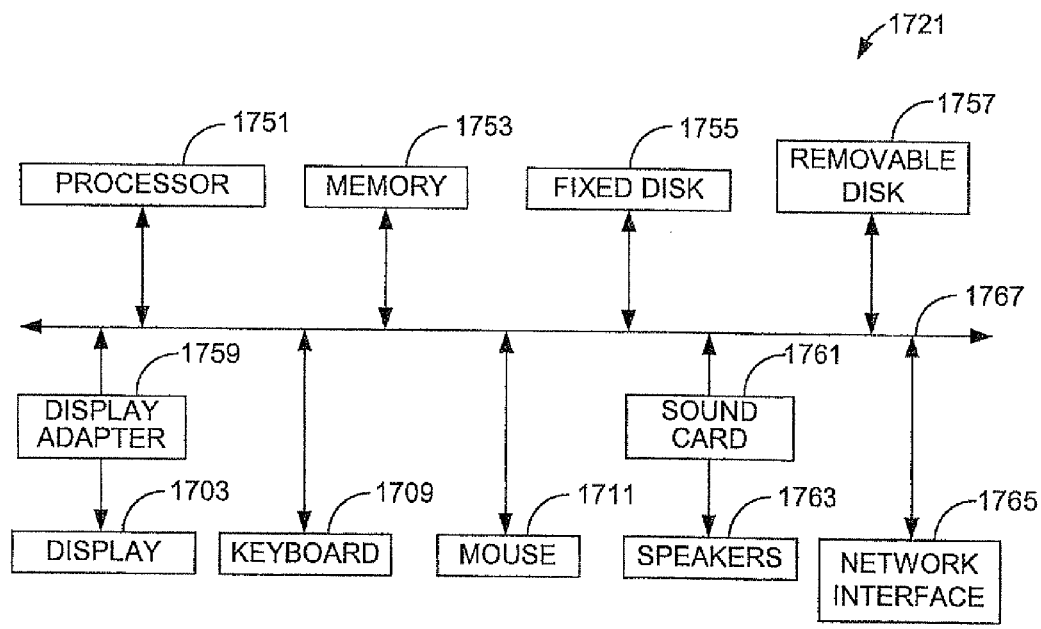

FIGS. 17A and 17B illustrate an example of a computer system that may be used in accordance with the invention. The computer system can, for example, correspond to any of the client machines, the intermediary server, or the remote or private servers. FIG. 17A shows a computer system 1721 that includes a display 1723, screen 1725, cabinet 1727, keyboard 1729, and mouse 1731. Mouse 1731 may have one or more buttons for interacting with a graphical user interface. The cabinet 1727 houses a removable medium (e.g., CD-ROM) drive 1733, system memory and a hard drive (see FIG. 17B) which may be utilized to store and retrieve software programs incorporating computer code that implements the invention, data for use with the invention, and the like. Although CD-ROM 1735 is shown as an exemplary computer readable storage medium, other computer readable storage media including floppy disk, tape, DVD, flash memory, system memory, and hard drive may be utilized. Additionally, a data signal embodied in a carrier wave (e.g., in a network including the Internet) may be the computer readable storage medium. In one implementation, an operating system for the computer system 1721 is provided in the system memory, the hard drive, the CD-ROM 1735 or other computer readable storage medium and serves to incorporate the computer code that implements the invention.

FIG. 17B shows a system block diagram of the computer system 1721 used to perform the processing of an embodiment of the invention. As in FIG. 17A, the computer system 1721 includes monitor 1723, keyboard 1729, and mouse 1731. The computer system 1721 further includes subsystems such as a central processor 1751, system memory 1753, fixed storage 1755 (e.g., hard drive), removable storage 1757 (e.g., compact disk), display adapter 1759, sound card 1761, speakers 1763, and network interface 1765. The central processor 1751 can, for example, execute computer program code (e.g., an operating system) to implement the invention. An operating system is normally, but necessarily, resident in the system memory 1753 during its execution. Other computer systems suitable for use with the invention may include additional or fewer subsystems. For example, another computer system could include more than one processor 1751 (i.e., a multi-processor system) or a cache memory.

The system bus architecture of computer system 1721 is represented by arrows 1767. However, these arrows are illustrative of any interconnection scheme serving to link the subsystems. For example, a local bus could be utilized to connect the central processor to the system memory and display adapter. The computer system 1721 shown in FIG. 17A is but an example of a computer system suitable for use with the invention. Other computer architectures having different configurations of subsystems may also be utilized.

Although the above-described embodiments refer to the use of a single intermediary server within an information retrieval system, it should be recognized that the information retrieval system can also include a plurality of intermediary servers. The various intermediary servers can individually receive requests from client machines and forward them to the appropriate servers and return responses back through the intermediary server to the client machine. By having multiple servers, not only can additional processing power be obtained, but load balancing, fault tolerance and localization issues can also be addressed.

The various aspects, features, embodiments or implementations of the invention described above can be used alone or in various combinations.

The invention is preferably implemented in software, but can be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that an intermediary server can be interposed between remote servers and clients to facilitate secure access. Another advantage of the invention is that content requested by clients can be altered to direct subsequent client requests to an intermediary server which, in turn, acquires the requested content for the clients. Still another advantage of the invention is that an intermediary server can authenticate requestors seeking access to resources on private networks through use of native authentication provided by the private network. Yet still another advantage of the invention is that secure remote access to private networks can easily be provided for authorized persons at reasonable costs.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method comprising:
   receiving a login request from a user for access to an intermediary server, the intermediary server storing an authentication identifier for each of a plurality of users, the authentication identifier identifying an authentication server;
   accessing, based on the authentication identifier, an authentication server, where the authentication server is separate and distinct from the intermediary server, to authenticate the user in response to the login request;
   receiving a resource request from the authenticated user at the intermediary server, the resource request requesting a particular operation with respect to a resource from a private network; and
   performing the particular operation at the private network to determine a response to the resource request.

2. The method of claim 1, where the accessing the authentication server comprises:
   determining a type of the authentication server; and
   generating authentication information for the user based on the type and the login request.

3. The method of claim 2,
   where the login request comprises a username of the user and a password of the user, and
   where the generating the authentication information comprises encrypting the username and the password using a shared secret key when the type is a first type.

4. The method of claim 2,
   where the login request comprises a password, and
   where the generating the authentication information, when the type is a second type, comprises:
      obtaining a value from the authentication server, and
      hashing the password with the value.

5. The method of claim 1, further comprising:
determining whether the response is of a type that is to be modified;
modifying the response in a predetermined way when the response is of the type that is to be modified; and
delivering the modified response to the user.

6. The method of claim 5, where the predetermined way comprises at least one of adding a toolbar to the response, modifying host name portions of one or more hyperlinks in the response, or adding suffixes to one or more of the hyperlinks in the response.

7. The method of claim 1, where the performing the particular operation at the private network comprises:
obtaining an identifier of a remote server in the private network based on the resource request; and
opening a connection between the intermediary server and the remote server using the identifier.

8. A method comprising:
receiving, by an intermediary server, a login request from a user at a client machine;
obtaining, by the intermediary server, an authentication identifier identifying an authentication server based on the login request;
sending, by the intermediary server, authentication information based on the login request to the authentication server;
receiving, by the intermediary server, an authentication response based on the authentication information from the authentication server; and
returning, by the intermediary server, an access page to the client machine when the authentication response indicates success, where the access page allows the user to access resources available on a private network connected to the intermediary server.

9. The method of claim 8, further comprising:
receiving, after returning the access page, a resource request from the user;
determining whether the user is permitted access to a remote server on the private network needed to process the resource request based on access privileges given to the user; and
transmitting the resource request to the remote server when the user is permitted access to the remote server.

10. The method of claim 9, where the determining whether the user is permitted access to the remote server comprises:
determining whether an Internet Protocol address of the client machine is authorized;
determining whether the resource request is made during a permitted time period; and
determining whether an operation associated with the resource request is permitted.

11. The method of claim 9, further comprising:
receiving a resource response from the remote server in response to the resource request;
determining whether the resource response is of a type that is to be modified; and
modifying the response based on a predetermined way when the response is of the type that is to be modified.

12. The method of claim 9, where the transmitting the resource request to the remote server comprises:
obtaining a host name of the remote server based on the resource request;
obtaining an Internet Protocol address of the remote server based on the host name; and
performing, by the intermediary server, a secure handshake with the remote server.

13. The method of claim 12, where the host name is stored in a data store of the intermediary server or is specified in a hyperlink associated with the resource request.

14. The method of claim 8, further comprising determining whether external authentication is required to authenticate the user,
where the authentication server is identified based on the login request only when the external authentication is required.

15. The method of claim 8, where the sending the authentication information comprises:
determining a type of the authentication server; and
generating the authentication information based on the type of the authentication server and the login request, where the login request comprises a password of the user.

16. An intermediary server comprising:
a memory to store an authentication identifier for each of a plurality of users, the authentication identifier identifying an authentication server; and
a processor, connected to the memory, to:
receive a login request from a user,
obtain the authentication identifier identifying the authentication server based on the login request,
send authentication information based on the login request to the authentication server,
receive an authentication response based on the authentication information from the authentication server,
receive a resource request from the user when the authentication response indicates success, and
process the resource request using a remote server located on a private network connected to the intermediary server.

17. The intermediary server of claim 16,
where the intermediary server communicates with the authentication server and the remote server through a firewall, and
where communications between the intermediary server and the user at a client machine are encrypted.

18. The intermediary server of claim 16, where the processor is further to:
parse content received from the remote server in response to the resource request; and
modify the content in a predetermined way.

19. The intermediary server of claim 16, where the processor is further to couple to an operating backup intermediary server that performs one or more functions of the intermediary server when the intermediary server fails.

20. The intermediary server of claim 16, where the processor is further to:
determine whether a stored hashed password is available for the user;
determine whether the stored hashed password is equal to a password in the login request when the stored hashed password is available; and
authenticate the user when the stored hashed password is equal to the password.

* * * * *